United States Patent
Seshadri et al.

(10) Patent No.: US 11,720,641 B2
(45) Date of Patent: *Aug. 8, 2023

(54) DATABASE SEARCH OPTIMIZER AND THEMED FILTERS

(71) Applicant: eBay Inc., San Jose, CA (US)

(72) Inventors: Narayanan Seshadri, San Jose, CA (US); Gyanit Singh, Fremont, CA (US); Justin Nicholas House, San Jose, CA (US); Nish Parikh, Fremont, CA (US); David Goldberg, Palo Alto, CA (US); Daniel Fain, Saratoga, CA (US); Huai-ter Chong, Saratoga, CA (US); Stephen Neola, Jersey City, NJ (US); Jonas Oscar Klink, White Plains, NY (US)

(73) Assignee: eBay Inc., San Jose, CA (US)

( * ) Notice: Subject to any disclaimer, the term of this patent is extended or adjusted under 35 U.S.C. 154(b) by 499 days.

This patent is subject to a terminal disclaimer.

(21) Appl. No.: 16/986,499

(22) Filed: Aug. 6, 2020

(65) Prior Publication Data

US 2020/0364281 A1 Nov. 19, 2020

Related U.S. Application Data

(63) Continuation of application No. 15/585,986, filed on May 3, 2017, now Pat. No. 10,831,842.

(Continued)

(51) Int. Cl.
*G06Q 30/00* (2023.01)
*G06F 16/9535* (2019.01)
(Continued)

(52) U.S. Cl.
CPC ........ *G06F 16/9535* (2019.01); *G06F 16/214* (2019.01); *G06F 16/2428* (2019.01);
(Continued)

(58) Field of Classification Search
CPC ............................................... G06Q 30/06–08
See application file for complete search history.

(56) References Cited

U.S. PATENT DOCUMENTS

| 5,819,291 A | 10/1998 | Haimowitz et al. |
| 6,243,715 B1 | 6/2001 | Bogantz et al. |

(Continued)

FOREIGN PATENT DOCUMENTS

| CN | 101496004 A | 7/2009 |
| CN | 102081776 A | 6/2011 |

(Continued)

OTHER PUBLICATIONS

Response to Non-Final Office Action Filed on May 26, 2020, for U.S. Appl. No. 15/585,986, dated Mar. 6, 2020, 16 pages.

(Continued)

*Primary Examiner* — Ethan D Civan
(74) *Attorney, Agent, or Firm* — FIG. 1 Patents

(57) ABSTRACT

In various example embodiments, a system and method for retrieving database records are presented. A method includes receiving an access request for database records, identifying a primary database record corresponding to the access request, and selecting a set of secondary database records corresponding to a portion of the access request. The method determines a set of differentiating elements within records of the set of secondary database records. Each differentiating element distinguishes at least one record of the set of secondary database records from one or more of the primary database record and a portion of the records included in the set of secondary database records. The method generates a formatted search interface including a set of selectable interface icons representing one or more differentiating (Continued)

elements and causes presentation of the formatted search interface at a client device associated with the access request.

20 Claims, 16 Drawing Sheets

Related U.S. Application Data

(60) Provisional application No. 62/331,726, filed on May 4, 2016.

(51) Int. Cl.
| | |
|---|---|
| G06F 16/906 | (2019.01) |
| G06Q 30/0601 | (2023.01) |
| G06F 16/9538 | (2019.01) |
| G06F 16/9038 | (2019.01) |
| G06F 16/338 | (2019.01) |
| G06F 16/21 | (2019.01) |
| G06F 16/242 | (2019.01) |

(52) U.S. Cl.
CPC .......... *G06F 16/338* (2019.01); *G06F 16/906* (2019.01); *G06F 16/9038* (2019.01); *G06F 16/9538* (2019.01); *G06Q 30/0631* (2013.01)

(56) References Cited

U.S. PATENT DOCUMENTS

| | | | |
|---|---|---|---|
| 6,313,834 B1 | 11/2001 | Lau et al. | |
| 6,516,327 B1 | 2/2003 | Zondervan et al. | |
| 6,711,575 B1 | 3/2004 | Applewhite et al. | |
| 6,865,577 B1 | 3/2005 | Sereda | |
| 8,073,840 B2* | 12/2011 | Smith | G06F 16/2456 |
| | | | 707/714 |
| 10,831,842 B2* | 11/2020 | Seshadri | G06F 16/214 |
| 2002/0120604 A1 | 8/2002 | Labarge et al. | |
| 2004/0019593 A1 | 1/2004 | Borthwick et al. | |
| 2006/0064411 A1 | 3/2006 | Gross et al. | |
| 2006/0190817 A1 | 8/2006 | Banks | |
| 2007/0106638 A1 | 5/2007 | Subramaniam et al. | |
| 2007/0118573 A1 | 5/2007 | Gadiraju | |
| 2007/0192725 A1 | 8/2007 | Chen et al. | |
| 2009/0043759 A1 | 2/2009 | Danish et al. | |
| 2009/0089275 A1 | 4/2009 | Drory et al. | |
| 2009/0125623 A1 | 5/2009 | Garg et al. | |
| 2011/0047175 A1 | 2/2011 | Cheng et al. | |
| 2011/0137928 A1 | 6/2011 | Engle et al. | |
| 2011/0167078 A1 | 7/2011 | Benjamin et al. | |
| 2014/0040313 A1 | 2/2014 | Shami et al. | |
| 2014/0052547 A1 | 2/2014 | Ghatare et al. | |
| 2014/0304293 A1 | 10/2014 | Richey et al. | |
| 2015/0058334 A1* | 2/2015 | Sundaresan | G06F 16/3322 |
| | | | 707/723 |
| 2015/0095185 A1 | 4/2015 | Katukuri et al. | |
| 2015/0112841 A1 | 4/2015 | Ivanovic et al. | |
| 2015/0310527 A1 | 10/2015 | Warren et al. | |
| 2017/0322971 A1 | 11/2017 | Seshadri et al. | |

FOREIGN PATENT DOCUMENTS

| | | |
|---|---|---|
| CN | 104322010 | 1/2015 |
| CN | 105917331 | 8/2016 |
| CN | 109154936 A | 1/2019 |
| CN | 1524236 | 3/2022 |
| JP | 2009230264 A | 10/2009 |
| KR | 10-2018-0128057 A | 11/2018 |
| WO | 0173597 | 10/2001 |
| WO | 2017/192745 A1 | 11/2017 |
| WO | 2017/192745 A8 | 10/2018 |

OTHER PUBLICATIONS

Response to First Action Interview Pre-Interview Communication filed on Sep. 3, 2019, for U.S. Appl. No. 15/585,986, dated Aug. 15, 2019, 5 pages.
Response to First Action Interview Office Action summary filed on Nov. 19, 2019, for U.S. Appl. No. 15/585,986, dated Sep. 19, 2019, 18 Pages.
Response to Final Office Action Filed on Feb. 13, 2020, for U.S. Appl. No. 15/585,986, dated Dec. 13, 2019, 16 pages.
Notice of Allowance received for U.S. Appl. No. 15/585,986, dated Jul. 1, 2020, 9 Pages.
Non Final Office Action received for U.S. Appl. No. 15/585,986, dated Mar. 6, 2020, 18 pages.
First Action Interview Pre-Interview Communication received for U.S. Appl. No. 15/585,986, dated Aug. 15, 2019, 5 pages.
First Action Interview Office Action Summary received for U.S. Appl. No. 15/585,986, dated Sep. 19, 2019, 6 pages.
Final Office Action Received for U.S. Appl. No. 15/585,986, dated Dec. 13, 2019, 19 pages.
Applicant Interview summary received for U.S. Appl. No. 15/585,986, dated Jan. 31, 2020, 3 pages.
Applicant Initiated Interview Summary Received for U.S. Appl. No. 15/585,986, dated May 20, 2020, 4 Pages.
Office Action received for Chinese Patent Application No. 201780027410.7, dated Nov. 10, 2021, 8 pages (2 pages of English translation and 6 pages of official copy).
Amendment filed on Nov. 2, 2018, for Korean Patent Application No. 10-2018-7031921, 5 pages (2 pages of English Translation and 3 pages of official copy).
Notice of Allowance received for Korean Patent Application No. 10-2018-7031921, dated Aug. 21, 2020, 5 pages (3 pages of official copy & 2 pages of English Translation).
Office Action Received for Korean Patent Application No. 10-2018-7031921, dated Mar. 28, 2020, 5 pages (3 Pages of Official Copy and 2 pages of English Translation).
Office Action Received for Korean Patent Application No. 10-2018-7031921, dated Sep. 28, 2019, 5 pages (3 pages of Official Copy and 2 pages of English Translation).
Response to Office Action filed on May 29, 2020 for Korean Application No. 10-2018-7031921, dated Mar. 28, 2020, 25 pages (18 pages of official copy & 7 pages of English Translation of claims).
Response to Office Action Filed on Nov. 28, 2019, for Korean Patent Application No. 10-2018-7031921,dated Sep. 28, 2019, 34 pages (27 pages of Official copy & 7 pages of English Translation of Claims).
International Search Report received for PCT Application No. PCTUS2017030876, dated Aug. 7, 2017, 2 pages.
Communication Pursuant to Article 94(3) EPC received For European Patent Application No. 17793271.2, dated Apr. 9, 2020, 5 pages.
Extended European Search Report received for European Patent Application No. 17793271.2, dated Apr. 24, 2019, 8 pages.
Response to Communication Pursuant to Article 94(3) filed on May 14, 2020, for European Patent Application No. 17793271.2, dated Apr. 9, 2020, 3 pages.
Response to European Search Report filed on Sep. 12, 2019 for European Patent Application No. 17793271.2, dated Apr. 17, 2019, 16 pages.
International Preliminary Report on Patentability received for PCT Patent Application No. PCT/US2017/030876, dated Nov. 15, 2018, 11 Pages.
International Written Opinion received for PCT Application No. PCTUS2017030876, dated Aug. 7, 2017, 9 pages.
201780027410.7 , "Notice of Decision to Grant received for Chinese Patent Application No. 201780027410.7", dated Mar. 28, 2022, 7 pages.
Ushijima , et al., "SUPRA: a sampling-query optimization method for large-scale OLAP", Proceedings Ninth International Workshop on Database and Expert Systems Applications (Cat. No. 98EX130). IEEE, 1998, 6 Pages.
Summons to Attend Oral Proceedings Received for European Patent Application No. 17793271.2, mailed on Oct. 22, 2020, 9 Pages.

(56) References Cited

OTHER PUBLICATIONS

Office Action received for Chinese Patent Application No. 201780027410.7 dated Jun. 11, 2021, 10 Pages(1 Page of English translation & 9 Pages of Official Copy).
U.S. Appl. No. 15/858,986, filed May 3, 2017, Pending.

* cited by examiner

DATABASE SEARCH OPTIMIZER AND THEMED FILTERS

RELATED APPLICATIONS

This application is a continuation of and claims priority to U.S. patent application Ser. No. 15/585,986, filed May 3, 2017, which claims the priority benefit of U.S. Provisional Application No. 62/331,726, entitled "DATABASE SEARCH OPTIMIZER AND THEMED FILTERS," filed May 4, 2016. These applications are incorporated by reference herein in their entireties.

TECHNICAL FIELD

Embodiments of the present disclosure relate generally to database record retrieval and, more particularly, but not by way of limitation, to database search optimization and retrieval of optimizing identification and retrieval of database records.

BACKGROUND

Conventional publication systems sometimes present search results in categories. The results may be presented in response to the entry of keywords employed in a search query or in response to a browse request, e.g., selection of a topic. One or more display categories may be selected for further exploration by a user or be automatically applied. In either case, the topics of conventional display categories are static in the sense that they do not typically change from search to search or are variously selectable by a user from a closed list.

Moreover, a user-created inventory of item listings or products can be highly varied in view of diverse inputs, even for similar product aspects, that can be made by sellers listing items for sale and stored in such an inventory. Technical difficulties can arise in searching such an inventory as the data is often unstructured.

BRIEF DESCRIPTION OF THE DRAWINGS

Various ones of the appended drawings merely illustrate example embodiments of the present disclosure and cannot be considered as limiting its scope.

Figure 1:
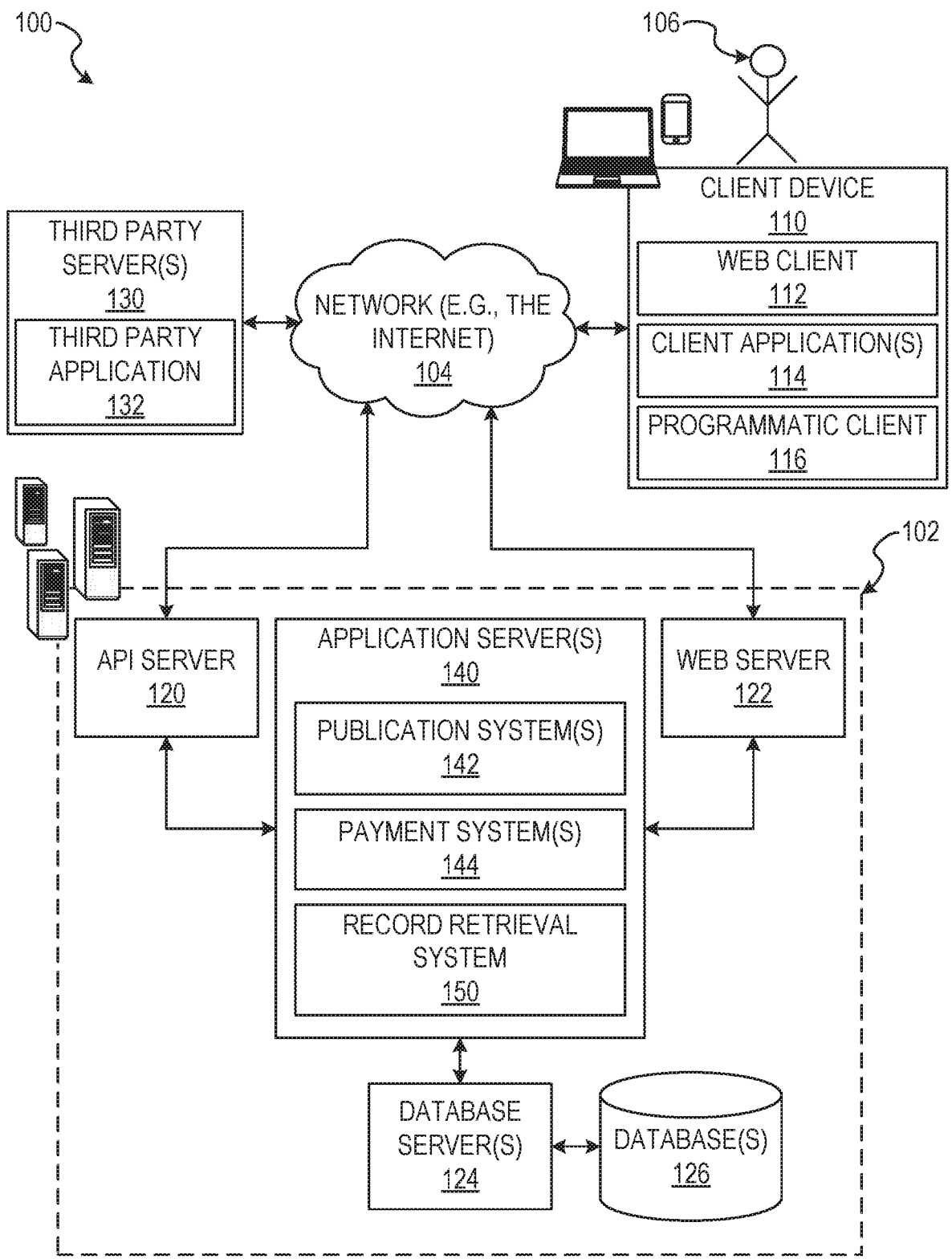
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various example embodiments, a record retrieval system is described. The record retrieval system offers themed filters or keywords for generating formatted search interfaces and retrieving suitable database records. In some embodiments, the record retrieval system identifies database records and generates tailored or formatted graphical user interfaces for searching a database. A formatted search interface provides database records and selectable aspects, differentiating among identified database records. Selection of an aspect may generate subsequent searches, cause a modification or revision of search terms used in a current search, or present different database records ordered or prioritized according to the selected aspect. For example, a user may be presented with a web page for a primary record (e.g., an item or product) or a landing page with a featured record (e.g., a featured product in inventory). The web page may include a number of selected aspects of the record. The user may select additional aspects or conflicting aspects (e.g., aspects different than those initially selected). The record retrieval system may then generate a search query from the user selections, based at least in part on the primary record or featured record. The record retrieval system may then identify additional records and generate a tailored user interface including some of the additional records and selectable aspects of the additional records.

In some example embodiments, themed filters are offered as a tool for users in a product publication system. Product publication systems may have access to a large number of publications or records. For example, a product publication system may have a large inventory of items available for purchase. Conventional publication systems often provide too many or redundant results or options for inventory searching. Redundant results, large numbers of results, and large numbers of search options often prevent a user from effectively viewing a representative sample of products or records within an inventory. Themed filters may provide a user with a verifiably representative sampling of results. Themed filters may also provide a user with a sense that all options and interesting results are presented, without clicking through all of them. Themed filters enables grouping of product or database records to collapse or otherwise represent long lists of results. A subset of "intelligent" or "smart" options can be created as user selections are made to gradually build a themed filter. Such themed filters may iteratively build search queries or access requests by adding, removing, or modifying keywords, terms, phrases, or combinations thereof to previously generated queries or requests. In some instances, themes may be grouped in light of multiple identified results (e.g., primary results). Themes may be grouped according to identified results with which they are associated. Themed filters may represent similarities or differences among identified results, and relate secondary results to an identified primary result. Such relation may indicate aspects of the results which are similar or which are distinguishing.

The record retrieval system described herein may generate themes dynamically. Themes may change and may be identified to represent inventory in a holistic manner. In some instances, a theme may be chosen or identified based on one or more factors, such as factors identified as purchase drivers, or factors that encourage selection of a result, or encourage selection of further themes. Themes may also be identified, changed, or presented to ensure that selectable options incorporate or represent a complete set of suitably related products or records. For example, automated theme generation and modification enables identification and presentation of database records in a "long-tail" of database records, where the long-tail comprises database records of varying levels of completion, levels of detail, levels of formality in description (e.g., usage of typos, colloquialisms, vernacular, or slang), obscurity (e.g., database records representing unique, niche, or custom physical items), or any other information at least partially failing to correspond to standard representations or categorizations of database records.

Automated theme generation and modification enables machine-learned and surfaced unique, tailored, or customized comparisons between database records. Such comparisons may reveal similarities, differences, clusters, or other relationships between database records. The machine-learned filters may incorporate and tailor comparisons based on user activity, preferences, and interactions. Such user tailored theme generation enables relevant database record retrieval and comparison based on implicit valuations or patterns identified for individual users, unavailable to previous systems engaged in simple category based comparison and record retrieval.

In some instances, the record retrieval system generates automatic themes, which may be initially applied to results, pursuant to a browse operation or search query. User-selected themes identified based on the browsing operation or search query may be subsequently selected and used to generate or select additional themes. For example, a combination of themes, such as condition and price, may be applied automatically. Afterwards, a user may be presented, with and may select, shipping, price, warranty, or any other suitable aspects of data relating to a diverse array of products, records, or inventory. Initial themes may be selected using any suitable information, such as user history, sales history, or behavior models.

Some systems offer statically structured interfaces or completely categorical relationships among products or records to be searched. Thus, points of comparison and aspects of comparison may differ. For example, a system with a fully structured set of records may offer items, products, or records to users by featuring or recommending one item with a single focus, a point, indicating what the fully structured system prioritizes. Embodiments of the present record retrieval system enable creation of themes for user searches. The themes enable identification of any product in an inventory and display of such inventory in a variety of ways tailored to the user. For example, the user may search by theme, by product, or by combinations thereof and enable immediate "click-through" to a desired record or product.

Various example embodiments of the present disclosure teach technical solutions in overcoming the technical problems described herein. In one aspect, open-ended themed filters are applied to search results for display to a user based on elements associated with selected database records (e.g., information relating to an inventory's characteristics). In other examples, themed filters are applied to any multi-item view, such as a view including both search results and recommendations. Technical solutions also may include multiple themes existing on multiple levels, facilitating deeper record comparison. Themed filters may enable users to identify similar or same records or products in an inventory which is at least partially unstructured or having records which are partially incomplete. For example, themed filters may enable identification of diverse inventory by positive aspects, despite broad variation among products or records in the inventory.

A highly varied inventory may be represented by database records stored in a database. Variations of the inventory may translate into variations in information stored within individual database records. Due to the variations in the information, database records contain different types of information, content, and completeness of information. As such, database records may be non-standard or contain non-standard aspects. Previously, databases including such database records or composed entirely of such database records were difficult to search. Themes, formatted search interfaces, and retrieval methods described in the example embodiments of the present disclosure can thus become beneficial m identification and retrieval of database records, ensuring at least one result for a given search, providing a suitable level of diversity in search results, and presenting search results and formatted search interfaces tailored to specific operating and display environments. For example, many different themes, based on the entire inventory content and diverse input, become possible and ensure accurate and tailored database record retrieval. Appropriately crafted themes may also offer a quick way to search and review the full scope of database records (e.g., an inventory's database), while offering a concise portal for directing a search or browse query to a specific result or area of interest.

With reference to FIG. 1, an example embodiment of a high-level client-server-based network architecture 100 is shown. A networked system 102, in the example forms of a network-based marketplace or payment system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Wash. State), an application 114, and a programmatic client 116 executing on client device 110. In some embodiments, the programmatic client 116 may comprise at least a portion of the record retrieval system 150.

The client device 110 may comprise, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user, e.g., a user 106, may utilize to access the networked system 102. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user that is used to perform a transaction involving digital items within the networked system 1 02. In one embodiment, the networked system 1 02 is a network-based marketplace that responds to requests for product listings, publishes publications comprising item listings of products available on the network-based marketplace, and manages payments for these marketplace transactions. One or more users 106 may be a person, a machine, or other means of interacting with client device 110. In embodiments, the user 106 is not part of the network architecture 100, but may interact with the network architecture 1 00 via client device 110 or another means. For example, one or more portions of network 1 04 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each client device 110 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given client device 110, then this application is configured to locally provide the user interface and at least some of the functionalities with the application configured to communicate with the networked system 102, on an as needed basis, for data and/or processing capabilities not locally available (e.g., access to a database of items available for sale, to authenticate a user, to verify a method of payment, etc.). Conversely if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 1 00, but may interact with the network architecture 100 via the client device 110 or other means. For instance, the user 106 provides input (e.g., touch screen input or alphanumeric input) to the client device 110 and the input is communicated to the networked system 102 via the network 104. In this instance, the networked system 1 02, in response to receiving the input from the user 106, communicates information to the client device 110 via the network 104 to be presented to the user 106. In this way, the user 106 can interact with the networked system 102 using the client device 110.

An application program interface (API) server 120 and a web server 122 are coupled to, and provide programmatic and web interfaces respectively to, one or more application servers 140. The application servers 140 may host one or more publication systems 142 and payment systems 144, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 142. The databases 126 may also store digital item information in accordance with example embodiments.

Additionally, a third-party application 132, executing on third-party server(s) 130, is shown as having programmatic access to the networked system 102 via the programmatic interface provided by the API server 120. For example, the third-party application 132, utilizing information retrieved from the networked system 102, supports one or more features or functions on a website hosted by the third party The third-party website, for example, provides one or more promotional, marketplace, or payment functions that are supported by the relevant applications of the networked system 102.

The publication systems 142 may provide a number of publication functions and services to users 106 that access the networked system 102. The payment systems 144 may likewise provide a number of functions to perform or facilitate payments and transactions. While the publication system 142 and payment system 144 are shown in FIG. 1 to both form part of the networked system 102, it will be appreciated that, in alternative embodiments, each system 142 and 144 may form part of a payment service that is separate and distinct from the networked system 102. In some embodiments, the payment systems 144 may form part of the publication system 142.

The record retrieval system 150 may provide functionality operable to perform various database record identification and retrieval from varied or non-standard database records in the database 126 using a formatted search interface or based on aspects, characteristics, history, or information relating to a user profile or a client device accessing the formatted search interface or the networked system 1 02. For example, the record retrieval system 150 may access the user-selected data from the databases 126, the third-party servers 130, the publication system 142, and other sources. In some example embodiments, the record retrieval system 150 may analyze the user data, search queries (e.g., search terms, keywords, formatted selections, or combinations thereof) to perform database record retrieval operations and generate tailored presentations of the database records, or portions thereof, and additional formatted search terms. As more content is added to a formatted search query (e.g., through selection of interface icons corresponding to aspects or elements of non-standard database records) by the user, the record retrieval system 150 can further refine the identified and retrieved database records and the formatted search interface. In some example embodiments, the record retrieval system 150 may communicate with the publication systems 142 (e.g., accessing database records in the form of item listings) and payment system 144. In an alternative embodiment, the record retrieval system 150 may be a part of the publication system 142.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system 142, payment system 144, and record retrieval system 150 could also be implemented as standalone software programs, which do not necessarily have networking capabilities.

The web client 112 may access the various publication systems 142 and payment systems 144 via the web interface supported by the web server 122. Similarly, the programmatic client 116 accesses the various services and functions provided by the publication systems 142 and payment systems 144 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

Additionally, a third-party application(s) 132, executing on a third party server(s) 130, is shown as having programmatic access to the networked system 102 via the programmatic interface provided by the API server 120. For example, the third-party application 132, utilizing information retrieved from the networked system 102, may support one or more features or functions on a website hosted by the third party. The third-party website may, for example, provide one or more promotional, marketplace, or payment functions that are supported by the relevant applications of the networked system 102.

Figure 2:
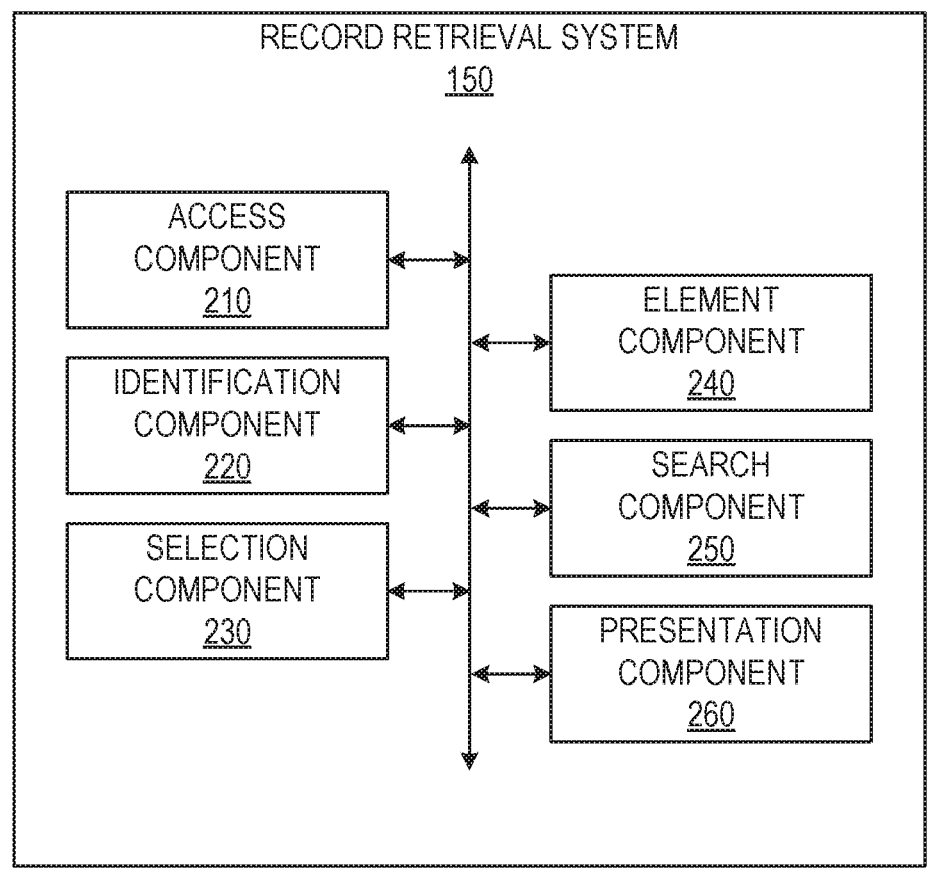
FIG. 2 is a block diagram of an example record retrieval system, according to some example embodiments.

FIG. 2 is a block diagram illustrating components of the record retrieval system 150, according to some example embodiments. The record retrieval system 150 is shown as including an access component 210, an identification component 220, a selection component 230, an element component 240, a search component 250, and a presentation component 260 all configured to communicate with one another (e.g., via a bus, shared memory, or a switch). Any one or more of the components described herein may be implemented using hardware (e.g., one or more processors of a machine) or a combination of hardware and software. For example, any module or component described herein may configure a processor (e.g., among one or more processors of a machine) to perform operations for which that component is designed. Moreover, any two or more of these components may be combined into a single component, and the functions described herein for a single component may be subdivided among multiple components. Furthermore, according to various example embodiments, components described herein as being implemented within a single machine, databases (e.g., database 126), or device (e.g., client device 110) may be distributed across multiple machines, databases, or devices.

Figure 3:
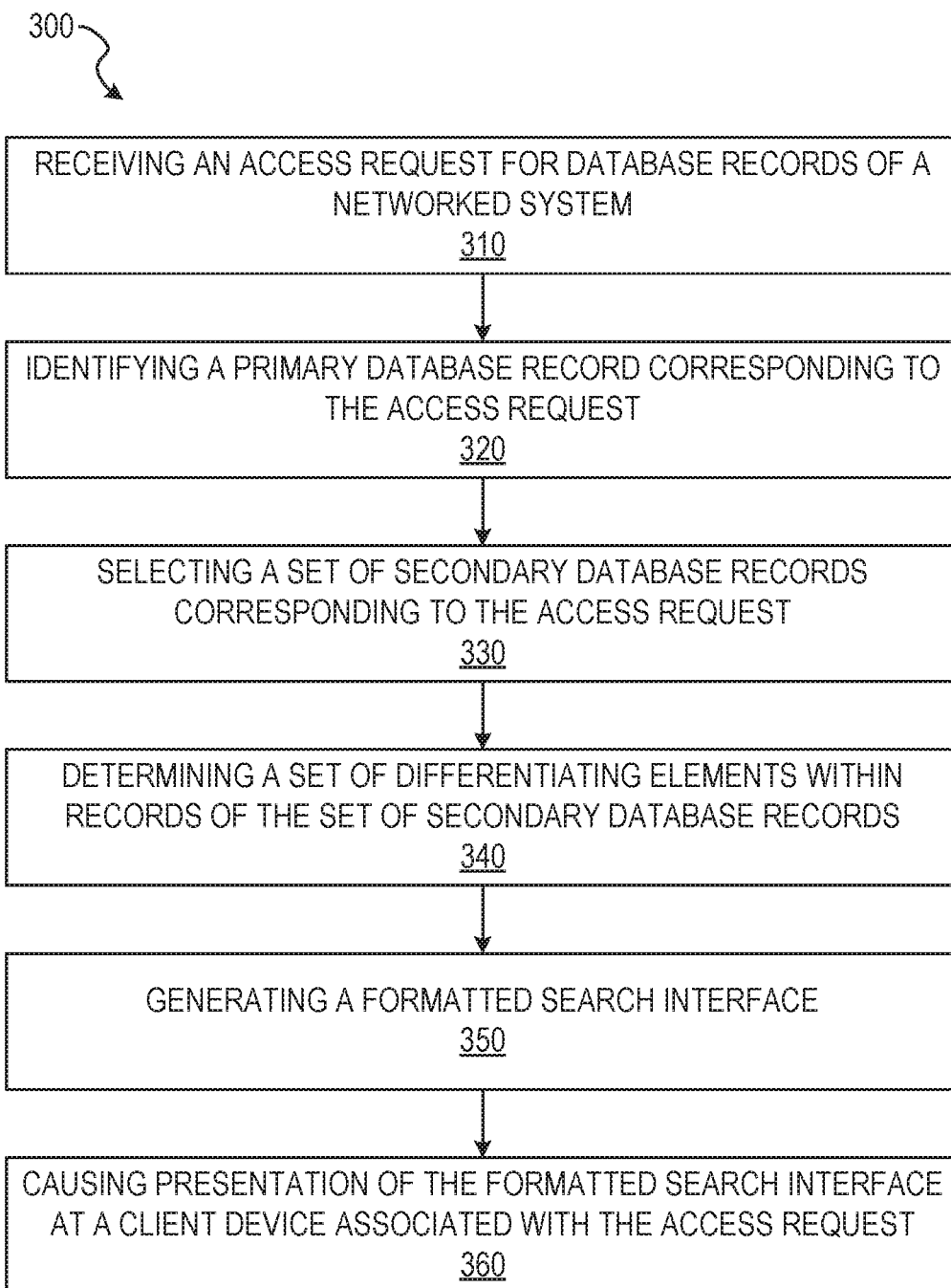
FIG. 3 is a flow diagram illustrating an example method of identifying and retrieving database records and generating a formatted search interface, according to some example embodiments.

FIG. 3 is a flow chart of operations of the record retrieval system 150 in performing a method 300 of identifying and retrieving database records and generating a formatted search interface, according to some example embodiments. Operations in the method 300 may be performed by the record retrieval system 150, using components described above with respect to FIG. 2.

In operation 310, the access component 210 receives an access request for database records of the networked system 102 (e.g., a network-based publication system). In some embodiments, the database records are stored on the database 126 coupled to the networked system 102. In some embodiments, the access request comprises a search query including one or more search terms (e.g., keywords, key phrases, or terms). In some instances, the access request includes an indication of a user associated with the access request. The access request may also include a model indicator. In some instances, the model indicator represents a selection of a model for use in identifying and retrieving database records.

Models may be generated to predict selection behavior associated with a general user of the networked system 102 or the record retrieval system 150. Models may also be generated or modified to reflect user histories, interactions, selections, or historical database record retrieval associated with a user, a user demographic, a user location or region, or any other suitable characteristic or set of characteristics. Models may be selectively generated according to privacy considerations or settings associated with specified users and may be generated in a manner that anonymizes or precludes identification of a specified user In some embodiments, models may be used or accessed in a manner that allows identification and retrieval of database records based on a specified model without revealing identifying information of a user through use of the modeled-based database record retrieval In some embodiments, the access request is generated in response to selection of a specified database record. For example, a database record may initially be retrieved and presented based on an initial search, a user history, an action prediction (e.g., a modeled selection of a database record of interest likely to be selected by a user), a feature characteristic, or any other suitable retrieval operation. In some instances, once an initial database record is retrieved, presented, and selected within a user interface of the client device 110, one or more components of the record retrieval system 150 identifies the selection and generates the access request. The generated access request may include an indication of one or more of the initial database record, data used to identify the initial database record, an identification of a user associated with one or more of the client device 110 or the selection of the initial database record, an identification of the client device 110, a location, combinations thereof, or any other suitable information associated with the identification and retrieval of the initial database record. Data used for identifying the initial database record may comprise one or more of a set of search terms, a set of user characteristics, a set of selections at a user interface associated with the publication system 142, or any other suitable data. Once the access request is generated, the component of the record retrieval system 150 generating the access request may pass the access request to the access component 210 or any other component of the record retrieval system 150.

In operation 320, the identification component 220 identifies a primary database record corresponding to the access request. Database records, such as the primary database record, may comprise a set of elements (e.g., portions of data). The set of elements may comprise one or more of category information, associated or representative keywords, item description information, metadata information, purchase information, price information, shipping information (e.g., shipping terms, shipping carriers, or shipping rates), time information, location information, user information (e.g., information identifying a seller of an item), combinations thereof: or any suitable information identifying, describing, or composing the database record. For example, where the database record represents an item listing of the publication system 142, the database record may include elements comprising an item description (e.g., keywords, key phrases, or text), seller information, purchase and shipping terms, and a purchase deadline.

In some embodiments, the identification component 220 identifies the primary database record by comparing information from the access request to elements contained in the primary database record. The identification component 220 may compare the information using one or more lookup operation, matching keywords from the access request to elements of the primary database record, matching standardized information (e.g., category titles) to elements of the primary database record, or any suitable search operation or set of operations. Matching of keywords, phrases, terms, or concepts may be performed using exact matches, fuzzy logic matches, partial matches, or any other suitable technique. In some instances, the identification component 220 identifies the primary database record based on a similarity threshold. In such instances, the two or more primary database records may be identified by the identification component 220. The identification component 220 may select the primary database record as a database record having a highest number of elements corresponding to the access request, a similarity score exceeding the similarity threshold, or any suitable manner.

In some instances, the identification component 220 identifies the primary database record based on two or more of a correspondence of elements to the access request, user information (e.g., history or shopping habits) of a user associated with the access request, an interest model tailored or modified for the user, a general interest model representing averaged histories or habits of users of the publication system 142 or the record retrieval system 150, combinations thereof: or any other suitable information. Where the identification component 220 incorporates information in addition to the access request, the identification component 220 may retrieve a set of proposed database records from correspondence of elements to portions of the access request. The identification component 220 may then narrow the set of proposed database records (e.g., selecting one or more primary database record) based on one or more of the user information, the tailored interest model, and the general interest model.

In operation 330, the selection component 230 selects a set of secondary database records corresponding to the access request. As described above, database records (e.g., primary database records and secondary database records) comprise elements or portions of data. In some embodiments, the elements describe, represent, or define aspects of a physical item, service, or document accessible via the publication system 142. The elements of the set of secondary database records may be divided into a set of similarity elements and a set of differentiating elements. Similarity elements may be understood as elements or portions of data of a database record which are determined to match or be similar to at least a portion of an access request or another database record. Differentiating elements may be understood as a set of elements or portions of data of a database record which distinguish a database record (e.g., the set of secondary results) from one or more of an access request or another database record (e.g., the primary database record or another secondary database record).

In some embodiments, the selection component 230 selects the set of secondary database records by determining that the set of secondary database records correspond to at least a portion of the access request. Where a secondary database record corresponds to a portion of the access request, at least one element (e.g., a similarity element) identified within the secondary database record matches or is otherwise similar to an element, aspect, characteristic, information, or keyword within the access request. In some instances, the selection component 230 selects the set of secondary database records by determining that the set of secondary database records corresponds to one or more of the access request, the primary database records, a previously identified secondary database record, combinations thereof, or portions (e.g., elements or keywords) thereof.

To select the set of secondary database records, one or more of the identification component 220 and the selection component 230 may initially identify a plurality of database records in a manner similar to or the same as described above with respect to operation 320. The plurality of database records may contain at least one element determined to match or be similar to at least a portion of the access request, the primary database record, or a previously identified secondary database record. The at least one element may be identified as a similarity element. The selection component 230 may then select the set of secondary database records from among the plurality of database record. In some embodiments, the selection component 230 selects the set of secondary database records as database records having a number of similarity elements, a ratio of similarity elements, or a similarity score greater than a predetermined threshold. The selection component 230 may also select the set of secondary database records from the plurality of database records as a representative group based on a random distribution, based on one or more categories associated with the plurality of database records, based on information (e.g., access or search history) of a user associated with the access request, based on information of the client device 110, or any other suitable information.

In some embodiments, the selection component 230 selects the set of secondary database records based on the differentiating elements within the database records. As described in more detail below, one or more of the selection component 230 and the element component 240 may determine the elements (e.g., differentiating elements) of the plurality of database records which differentiate the database records from one another and from the primary database record. Selection of the set of secondary database records may incorporate an outlier filter. The outlier filter may remove misclassified database records or other database records from the set of secondary database records which remove outliers based on a content of the database record. In some instances, the outlier filter removes outlying database records based on a predetermined threshold. The predetermined threshold may be an outlier threshold, indicating a baseline similarity threshold between database records to be included in the set of secondary database records. The predetermined threshold may also be a content threshold, indicating a baseline relatedness threshold between a database record and a specified element. A database record having a number, proportion, or content level above the content threshold indicates the element (e.g., an element of the access request, a similarity element, or a differentiating element) is sufficiently related to a content of the database record to justify inclusion of the database record in the set of secondary database records. In some instances, the outlier filter is a median absolute deviation (MAJ)) filter. Although described with reference to a specified filter, it should be understood that other suitable filters may also or may alternatively be used.

In operation 340, the element component 240 determines a set of differentiating elements within records of the set of secondary database records or the plurality of database records from which the set of secondary database records are selected. In some example embodiments, each differentiating element distinguishes at least one record of the set of secondary database records from one or more of the primary database record and a portion of the records included in the set of secondary database records. The differentiating elements may also distinguish a secondary database element from a portion of the access request.

In some instances, the element component 240 may determine the differentiating elements as elements of the plurality of database records which do not correspond to one or more of the access request, the primary database record, or at least one other database record of the plurality of database records. The element component 240 may determine that a differentiating element does not correspond to the access request or other database records where the differentiating element fails to match a keyword, fails to share a categorical relation, or is not similar to an element or aspect of the access request or other database records.

In some embodiments, the element component 240 identifies all of the elements within the plurality of database records. The element component 240 may determine the differentiating elements by isolating elements (e.g., attributes of a database record) within two or more database records, where the isolated element is a single differentiating (e.g., mismatched) element within the two or more otherwise identical database records. The element component 240 may then assign a differentiation value to each differentiating element. The differentiation value may represent a relative importance or predictive value for the differentiating element indicating a likelihood that a user will select a database record upon presentation of the differentiating element. The differentiating value may be generated by Equation 1, below.

$$R(a1)=(P(a1,v1)-P(a1,v2))*100/(P(a1,v1)) \quad \text{Equation 1}$$

In Equation 1, a1 may be an attribute (e.g., differentiating element) for which the differentiating value is being determined. Values of attributes being compared are represented by "v1" and "v2." "R" is a relative value and "P" is a function value (e.g., a function of price, a median value, a median price, or any other suitable value). In some instances, such as an internet-based commerce system, the differentiating value may indicate a value that a user is willing to pay to purchase an item listing having that differentiating element compared to an otherwise identical product or item listing.

In some embodiments, the differentiation value may be determined based on user behavior, such as view-trails. Click/view trails (e.g., view-trails) may be defined as a time ordered set of page views (e.g., presentation of a user interface screen corresponding to a specified database record). For example, a view trail may be a set of page views of items in on an online shopping website ordered by a time at which each page was viewed or accessed. A length of a view trail may correspond to a number of database records accessed or viewed. The length of the view trail (e.g., the number of database records counted for a view trail) may be based on a session of activity, access requests (e.g., a series or set of database records viewed after an initial access request and before a subsequent access request), a relationship of database records viewed (e.g., a similarity or similarity score of database records viewed), combinations thereof, or any other suitable demarcation aspect. By way of example, a view trail may include viewing database records of a tablet computing device. The database records accessed may correspond to a tablet having storage capacities of 16 GB and 32 GR The view trail may contain both database records. The view trail may also incorporate selected elements, such as shipping status (e.g., free shipping or expedited shipping), return options (e.g., free return), or other suitable user interface selections. Once selected, the elements may be incorporated into a view trail.

In some instances, view trails are divided into successful view-trails and unsuccessful view-trails. A successful view-trail may be understood as a view trail terminating in a specified action. The specified action may be selected from a set of specified actions. The specified action may be an action indicating an interaction with a database record comprising more than viewing of the database record. For example, a specified action may comprise modifying the database record, deleting the database record, linking or transmitting an indication of the database record to another user, completing a transaction corresponding to the database record (e.g., purchasing a product represented by the database record), combinations thereof, or any other suitable action.

In embodiments where the view-trails are incorporated into behavior models, weighted selection of differentiating elements, or determining differentiation values. The element component 240 may define behavioral values for a given user or a database record with respect to values for which differentiating elements are to be determined. By way of example, the set of secondary database records may comprise a set of n item listings for a corresponding item. The record retrieval system 150 may use the set of n item listings to infer a supply distribution of elements associated with the product. The elements may be understood as an attribute set "A," where the attribute set comprises attributes "$a_1$, $a_2$, ... $a_k$." The supply distribution, "S," may be defined by Equation 2, below. In Equation 2, S(P, a) may be a number listing for a product P (e.g., the item corresponding to the set of n item listings) with attribute "a," divided by a total number of listings for product P.

$$S;A \rightarrow [0,1]. \quad \text{Equation 2}$$

Behavioral values may comprise an impulsive value and a stickiness value. In some instances the impulse value and the stickiness value represent a page view threshold. A successful view-trail may be identified as impulsive where the view-trail is has a length less than or equal to a specified value (e.g., one or two page views prior to performing the specified action). A successful view-trail may be identified as sticky or persistent where a specified element (e.g., an element of the set of secondary database records) remains constant for a threshold number of page views.

In determining an impulse value, the element component 240 may generate an impulse score for a database record or a specified element Where the impulse score is generated for the database record, the element component 240 may define the impulse score using Equation 3, below. In Equation 3, "$N_1$" is a number of page views of a successful view trail, "$SVT_1$," determined to be impulsive. The database records corresponding to each page view of SVT of $N_1$ may share the element "a." "$N_2$" is a number of page views of a successful view trail, "$SVT_2$," determined to be impulsive. In some instances, the successful view trail, $SVT_2$, may be a specified or selected example impulsive view-trail of the user associated with the access request, an average impulsive view-trail of the user, an averaged impulsive view-trail for all users or a subset of users of the publication system 142, or any other suitable impulsive view-trail.

$$\text{Impulsive\_Score}(P,a) = N_1 \text{ of } SVT_1 \text{ with attribute } a/N_2 \text{ of } SVT_2. \quad \text{Equation 3}$$

As shown above, the element component 240 may first determine a specified view-trail is impulsive based on the impulse value. Upon determining that a view-trail is impulsive, the element component 240 may evaluate the element, "a," of the database record, "P," using Equation 3 to identify the impulse score for that element. A specified element, "a," may be understood to be an impulsive element where the impulsive value for the element above a specified threshold. For example, an element may be understood as an impulsive element where the impulsive score is greater than 0.15. Although described with a specified value, it should be understood that the specified threshold may be set at any suitable value.

In determining the stickiness value, the element component 240 may determine a stickiness quotient for a specified element and a specified successful view trail. In some embodiments, the element component 240 determines the stickiness quotient using Equation 4, below. In Equation 4, "SVT" is a successful view trail and "a" is a specified element for which a differentiation value is being determined using a stickiness score and the stickiness quotient. As shown in Equation 4, the stickiness quotient may be understood as a ratio of a number of page views of database records, "N1," of SVT where the database record is associated with element "a" to a random expectation of SVT as inferred by S(P,a) of Equation 2.

$$\text{Stickiness\_quotient}(SVT,a) = N_1 \text{ of views with } a \text{ in } SVT/(\text{length of } SVT * S(P,a)) \quad \text{Equation 4}$$

In some instances, the element component 240 determines the stickiness score for the element according to Equation 5, below As shown below, "N 1" is a number of page views for a specified successful view trail, "SVT1" such that the stickiness quotient of the SVT of Equation 4 is greater than 1.5 divided by a number, "N2," of page views for a set of successful view trails, "SVTs," for a set of database records, "P."

$$\text{Stickiness\_score}(P,a) = N_1 \text{ of } SVT_1 \text{ s.t. Stickiness\_quotient}(SVT,a) > 1.5/N_2 \text{ of SVTs for } P \quad \text{Equation 5}$$

An attribute may be understood as being persistent where the stickiness score of greater than 0.15. Although described with a specified value, it should be understood that the specified threshold may be set at any suitable value. As such, an element may be impulsive where users are more likely to impulsively perform a specified action on a database record based on the presence of the element more often than a random chance would suggest. An element may be persistent where the element is maintained in a view-trail or set of successive searches which results in performance of the specified action. In some instances, the differentiating value is determined using one or more of the impulsive score, the stickiness score, behavior signals, page contexts, device contexts, user contexts, feature contexts, combinations thereof, and other suitable factors. In some instances, impulsive score and stickiness score values may be inserted into Equation 1 as "vi" and "v/' for comparison and generation of the differentiation value.

Figure 4:
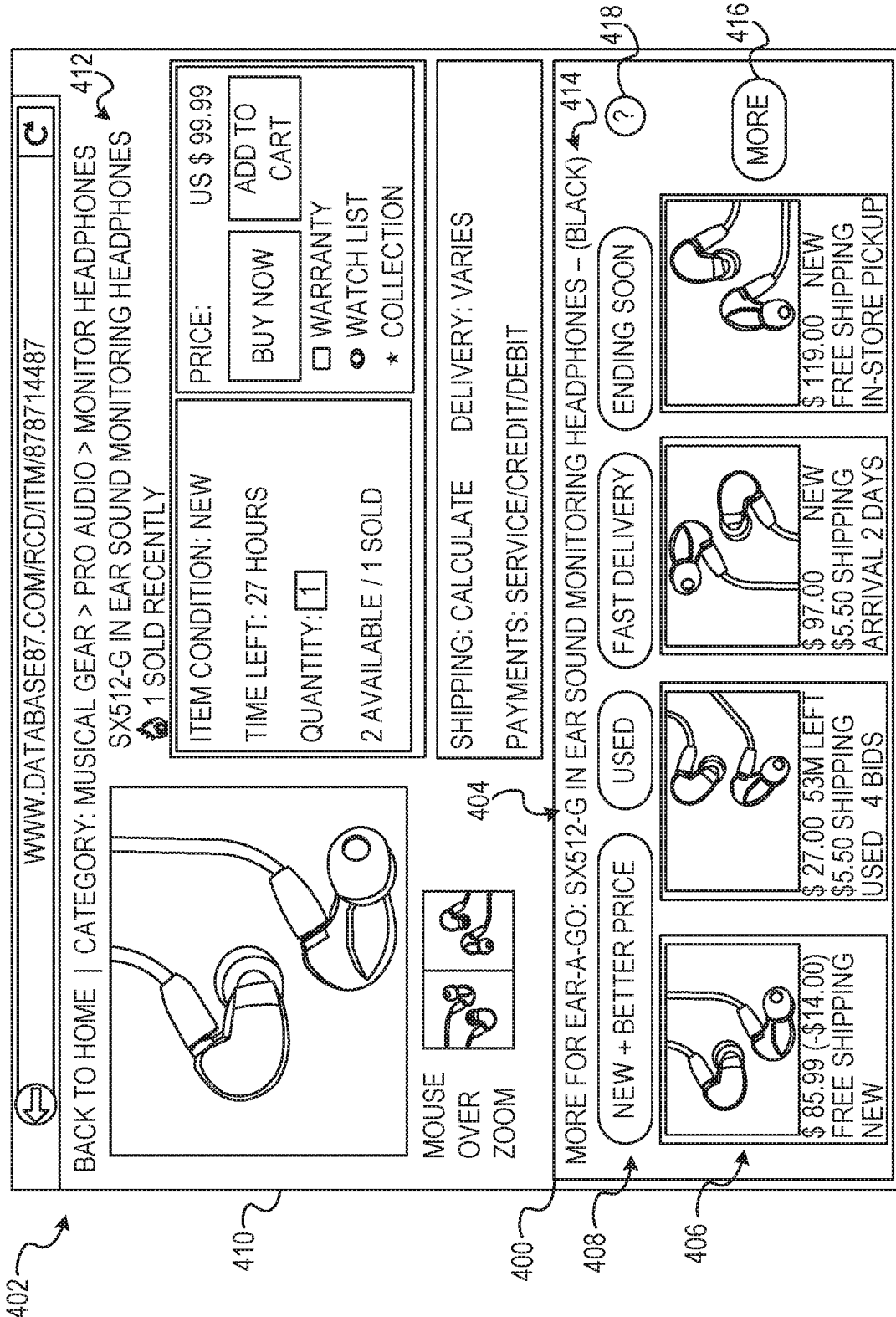
FIG. 4 is an example interface diagram illustrating a user interface screen of a record retrieval system, according to some example embodiments.

In operation 350, the search component 250 generates a formatted search interface. An example embodiment of a formatted search interface 400 is depicted in FIG. 4. In some embodiments, the formatted search interface is a graphical user interface depicting a portion of the primary database record and a portion of the set of secondary database records. In some instances, the formatted search interface includes a representation of the primary database record, one or more representations of a subset of records of the set of secondary database records, a set of selectable interface icons representing one or more differentiating elements of the set of differentiating elements, combinations thereof and any other suitable information.

In some embodiments, the search component 250 generates the formatted search interface using one or more sub-operations. The sub-operations may include selection of differentiating elements for inclusion and representation as the set of selectable interface icons. In some instances, one or more of the search component 250 and the element component 240 select the differentiating elements based on one or more of a number of interface icons (e.g., search themes or filters), a type of the differentiating elements to be displayed, an order of the interface icons, and a content of the differentiating elements to display.

In some instances, selection of the set of differentiating elements is a weighted consideration of a page context, a device context, a user context, a feature context, a seasonality context, a relevant inventory context, a relevant seller context, and a record characteristic context. The page context may be understood as a web page or graphical user interface screen in which the interface icons are to be displayed. The device context may comprise a device size and a device platform (e.g., a web-based application, a native application, or a user-installed application). In some embodiments, one or more of the user context may be incorporated into behavior models generated for or tailored to a user associated with the access request. The user context may comprise user behavior such as a user history of interactions with one or more of the record retrieval system 150 or the publication system 142. In some embodiments, user behavior may comprise behavior signals such as access flow, search history flow, click/view trails, search or access patterns, shopping patterns, impulsivity, and other suitable interaction signals.

The seasonality context may be understood as a representation of shopping occasions, a time of year, a holiday, or any other time-based occasion. The relevant inventory context may be understood as comprising item conditions, price, or any other characteristic related to a state of an item represented by a database record associated with a differentiating element. The relevant seller context may be understood as an availability of the database record or an item represented by the database record associated with the differentiating element. The record characteristic context may be understood as a characteristic of a product represented by the database record. The product characteristic may comprise one or more of a category, a product lifecycle stage, a trending price, one or more features of the product, and one or more specifications of the product.

In some embodiments, the user context may also comprise a predicted user intent based on one or more of the user history and an interaction model for the user. The feature context may be a premium or priority associated with differentiating elements given any one of the described contexts. For example, a user may interact with the record retrieval system 150, with a specified or predicted intent, and be presented with multiple (e.g., two to three) primary database records and a plurality of secondary database records corresponding to the primary database records. The plurality of secondary database records may be selected as one to three secondary database records per primary database record. By way of further example, a user with a specified or predicted product intent may be presented with a single primary database record and the plurality of secondary database records corresponding to the primary database record. A user accessing the record retrieval system 150 with a specified or predicted product intent may be presented with a single or multiple primary database records with a limited number (e.g., one to five) secondary database records, selected for relevance to the primary database record or selected as representative records for a larger set of retrieved results. In another example, a user may have a specified or predicted product or item intent and be presented with two or three primary database records, with no secondary database records. In such example embodiments, selectable user interface icons (e.g., differentiating elements or themes) may still be selected for inclusion in a generated user interface.

In some instances, the sub-operations performed to generate the formatted search interface include identifying aspects, characteristics, or specifications of a client device associated with the access request or at which the formatted search interface is to be presented. To generate the formatted search interface, in some instances, the search component 250 identifies a display dimension of a display device coupled to the client device.

Figure 5:
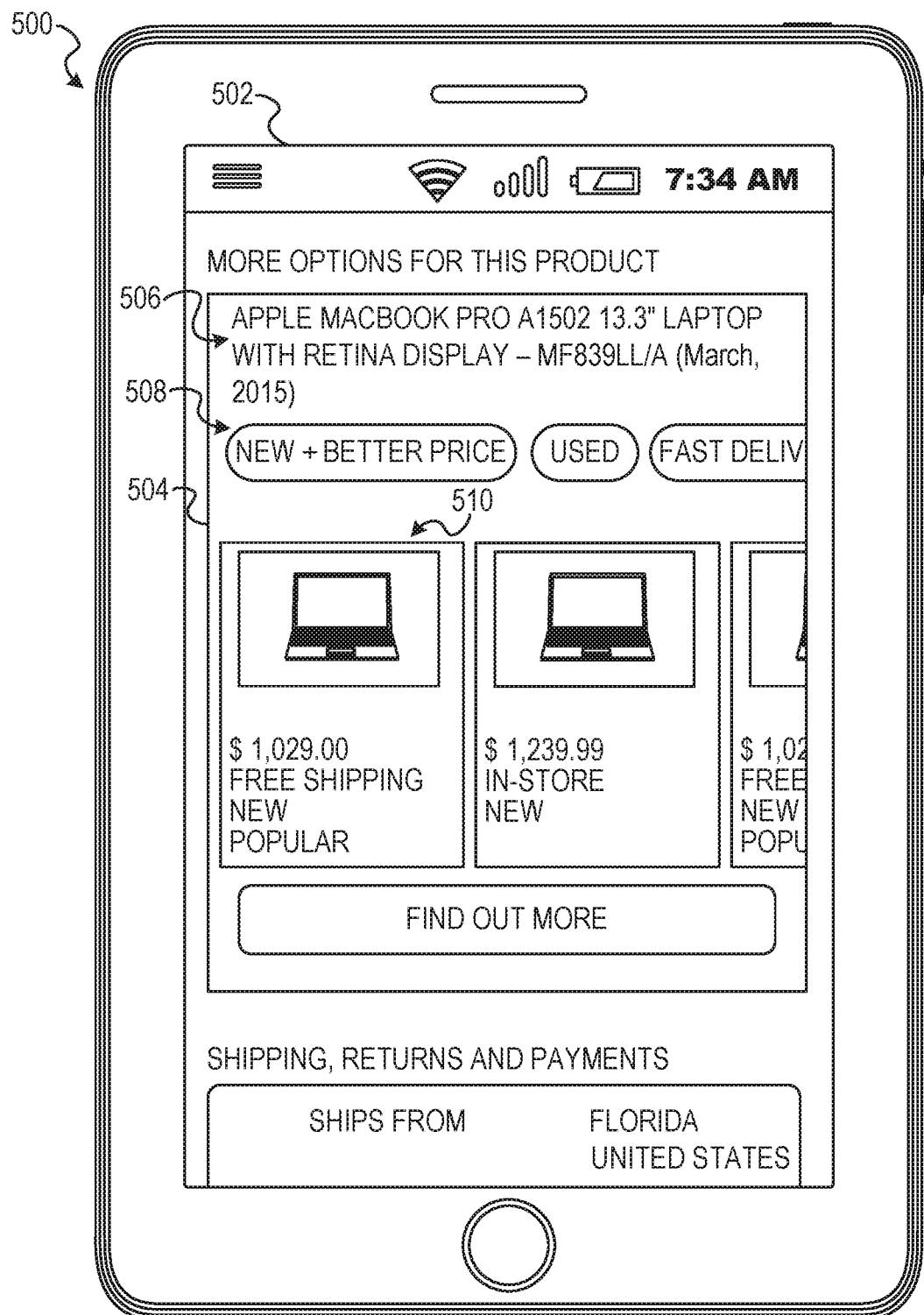
FIG. 5 is an example interface diagram illustrating a user interface screen of a record retrieval system, according to some example embodiments.

Based on the display dimension, in some embodiments, the search component 250 determines a first display characteristic and a second display characteristic. An example embodiment of a formatted search interface incorporating a first display characteristic and a second display characteristic is depicted in FIG. 5. In some instances, the first display characteristic is determined for the set of selectable interface icons. The first display characteristic may be configured to enable manipulation of the set of selectable interface icons independent of manipulation of a remaining portion of the formatted search interface. In some embodiments, the first display characteristic comprises one or more of a scrolling orientation, a dimension threshold, and a set value indicating a number of selectable interface icons to be included in the set of selectable interface icons.

The second display characteristic may be determined for the representations of the subset of records of the set of secondary database records. The second display characteristic may be configured to enable manipulation of the subset of records independent of the set of selectable icons. The second display characteristic may also be configured to enable manipulation of the subset of records independent of a remaining portion of the formatted search interface.

In operation 360, the presentation component 260 causes presentation of the formatted search interface at a client device associated with the access request. In some embodiments, the presentation component 260 presents the formatted search interface at the client device 110 by transmitting the formatted search interface from a portion of the record retrieval system 150 on the networked system 102 to the client device 110 via the network 104. Where at least a portion of the presentation component 260 is implemented on the client device 110, the presentation component 260 may cause presentation of the formatted search interface by rendering or otherwise displaying the formatted search interface at a display device (e.g., a touchscreen of a smartphone or mobile computing device) which is part of, coupled to, associated with, or otherwise in communication with the client device 110.

Referring again to FIG. 4, an example embodiment of the formatted search interface 400 is depicted. The formatted search interface 400 is a graphical user interface 402 depicting, or otherwise comprising, information from the primary database record and the set of secondary database records. As shown, the formatted search interface 400 includes a representation of the primary database record 404, one or more representations 406 of a subset of records of the set of secondary database records, and a set of selectable interface icons 408 representing one or more differentiating elements of the set of differentiating elements.

In some embodiments, the formatted search interface 400 is generated as part of and positioned within a user interface depicting additional information. As shown in FIG. 4, the formatted search interface 400 is generated or inserted as a part of a publication interface page 410. The publication interface page 410 may be a product review page, an item listing, or any other suitable user interface comprising information retrieved from the publication system 142. In FIG. 4, the publication interface page 410 comprises an item listing for an item 412 corresponding to the primary database record. The publication interface page 410 may depict a portion of the primary database record or elements selected from the primary database record.

The formatted search interface 400, depicted within the publication interface page 410, is shown as containing the representation of the primary database record 404 in the form of a title 414 of the item. The title 414 may be an element of the primary database record. In some instances, the title 414 is a set of words derived from elements of the primary database record. For example, the title 414 may be a shortened version of a title of the primary database record, a combination of pertinent similarity elements from the primary database record, or any other suitable derivative information. In some embodiments, the element (e.g., title 414) selected for depiction in the representation of the primary database record 404 is an element common to the primary database record and the set of secondary database records.

The representation of the primary database record 404 may be presented in conjunction with additional information (e.g., item description, purchase terms, shipping terms, and availability) of the primary database record. For example, where the primary database record comprises an item description for a mobile computing device (e.g., a tablet), the item description and other relevant information may be portrayed in a portion of the publication interface page 410 surrounding or proximate to the formatted search interface 400. A review interface, not shown, may depict reviews relating to the tablet, pulled from the primary database record or related database records or metadata. In some instances, the review interface is operable in cooperation with the set of selectable interface icons 408. In these instances, the review interface may dynamically display reviews corresponding to selections of differentiating elements represented by specified selectable user interface icons of the set of selectable interface icons 408.

In some embodiments, the one or more representations 406 of the subset of secondary database records comprise a representative image, a title, an information icon, selection information, and other suitable defining information. The image may be a product depiction or image corresponding to an item represented by a secondary database record. The title may be generated and depicted as text, selected from a represented secondary database record, corresponding to at least one differentiating element corresponding to an interface icon of the set of selectable interface icons 408. The information icon may be a selectable element providing additional information relating to a specified database record. In some instances, the selection information comprises one or more of a price, a shipping cost, combinations thereof, and an item listing time for which the represented secondary database record will be retrievable or the underlying item may be purchasable.

In some instances, where a representation of a secondary database record corresponds to one or more secondary database records associated with a record cluster, the representation comprises one or more of a set of comparison points (e.g., similarity elements or differentiating elements configured to compare two or more secondary database records), a settings icon, combinations thereof, or any other suitable information. The settings icon may correspond to a menu including actions operable, via icon selection, on the representation or actions of the record retrieval system 150. For example, operations may comprise a "view more" operation generating a search or access query to identify similar database records, a "watch" operation configured to add a secondary database record corresponding to a selected representation to a watch list of the user, or any other suitable operations.

The set of selectable interface icons 408 may each include a distinct differentiating element. As shown in FIG. 4, the set of selectable interface icons 408 indicate elements of the set of secondary database records via a text description (e.g., a word or keyword) incorporated into the icon. The selectable interface icons 408 may be understood as themes for modifying, presenting, or generating search queries in a formatted manner, ensuring presentation of at least one primary database record and at least one secondary database record. In some instances, themes may be related to specific database records (e.g., an item's condition, price, or delivery options) or categories of database records (e.g., a condition category, a price category, or a time category).

Themes may include elements designating an item or category of items as new, new and better price, used, fast delivery, ending soon, and other suitable information or elements. In some instances, the set of selectable interface icons 408 may include an initial set of default differentiating elements, modified based on the identified primary database record and set of secondary database records. For example, a set of default differentiating elements may include one or more of general aspects such as color and manufacturer. Modification of the default differentiating elements may incorporate database record-specific aspects such as colors specified in one or more of the set of secondary database records (e.g., Space gray, Gold, Rose Gold, White, 64 gigabytes, 128 gigabytes, or 256 gigabytes).

Selection of an interface icon may correspond to selection of the differentiating element. In some embodiments, upon selection of an interface icon, the record retrieval system 150 selects the differentiating element corresponding to the selected icon, incorporates the differentiating element into a subsequent access request, search query, or filter, and identifies subsequent database records based on the selected interface icon. In some embodiments, the record retrieval system 150 will perform one or more operations of the method 300 upon selection of the interface icon to generate and present a modified primary database record, set of secondary database records, and set of selectable interface icons based, at least in part, on the selected differentiating element.

By way of example, where an interface icon of "lowest total cost" is selected, the record retrieval system 150 may identify secondary database records of the set of secondary database records having a lowest product price in combination with free shipping, and present the identified secondary database records. In some instances, the identified secondary database records may be identified or selected by filtering and sorting the set of secondary database records according to the selected theme or differentiating element corresponding to the selected interface icon. The identified secondary database records may be presented in a new formatted search interface with a new primary database record. The identified secondary database records may also be presented in the existing formatted search interface, modified to include the newly identified database records. In such instances, the newly identified secondary database records may be presented in the modified search interface with the existing primary database record.

The set of selectable interface icons 408 present an entry point for exploring database records (e.g., inventory, products, or publication records) of the publication system 142. Such formatted search operations may preclude search errors encountered by users mistyping keywords, typing keywords unassociated with any database record, or omitting previously entered criteria (e.g., keywords, search terms or phrases, similarity elements, or differentiating elements) in a subsequent related search query.

In some embodiments, the formatted search interface 400 includes an exploration icon 416. The exploration icon 416 may be configured to expand a display of retrieved database records (e.g., the representation of the subset of records). Upon selection of the exploration icon 416, the record retrieval system 150 may generate a modified user interface screen incorporating additional secondary database records, or representations thereof The record retrieval system 150 may present representations for all of the set of secondary database records, expanding the previously presented subset. In some instances, in response to selection of the exploration icon 416, the record retrieval system 150 may present or expand the retrieved database records by displaying secondary database records which are associated with a specified differentiating element corresponding to a selected interface icon or associated with a selected representative secondary database record.

In some instances, the publication interface page 410 is presented on a display device of the client device 110. A user, being presented with the publication interface page 410, may seek additional information for the set of selectable interface icons 408. One or more description icons 418 may be presented proximate to the set of selectable interface icons 408. Selection of a description icon 418 may generate an overlay, a pop-up window, or any other suitable temporary presentation of the information associated with the description icon 418. The one or more description icons 418 may be selectable user interface icons (e.g., buttons) configured to display information regarding one or more aspects of the publication interface page 410, such as the set of selectable interface icons 408. The information for the one or more description icons 418 (e.g., an information icon) may be dynamically generated, such that the information associated with the one or more description icons 418 is tailored or associated with the set of selectable interface icons 408 and the corresponding differentiating elements at a time of presenting the publication interface page 410. For example, selection of a description icon 418 may cause presentation of information relating to differentiating elements, comparisons of differentiating or similarity elements, a shipping cost or shipping cost calculation, seller information, a seller profile link, or any other suitable information.

Referring now to FIG. 5, a mobile computing device 500 is depicted. A display device 502 of the mobile computing device 500 is presenting an example formatted search interface 504. The formatted search interface 504 comprises a first representation 506 of the primary database record, a set of interface icons 508 representing a portion of an identified set of differentiating elements, and a set of representations 510 of the subset of secondary database records. The set of interface icons 508 are presented according to an example first display characteristic, and the set of representations 510 are presented according to an example second display characteristic. The display characteristics (e.g., the first display characteristic and the second display characteristic) may comprise values indicating one or more of a relative display position, a size or relative size of displayed elements, a menu type, a manipulation type, a manipulation orientation, and a presentation number.

As shown in FIG. 5, a first display characteristic of the set of interface icons 508 includes a relative position value, a size value, a manipulation type, and a manipulation orientation. The relative position value positions the set of interface icons 508 above the set of representations 510 and at least a portion of the information relating to the primary database record, such as shipping information, return information, and payment information. The size value limits a vertical height of the set of interface icons 508 corresponding to a display dimension. The manipulation type configures presentation of the set of interface icons 508 corresponding to a selected input type of the mobile computing device, such as swiping on a touch screen, voice interface of a wearable computing device (e.g., a smartwatch), or sequential interactions (e.g., combined tapping, swiping, voice, and physical buttons) configured complex operations on a limited screen size of a smartwatch. The manipulation orientation configures a manipulation direction of the set of interface icons 508 to ensure an ability to intentionally manipulate the interface icons independently of remaining portions of the user interface presented on the display device 502. For example, as shown in FIG. 5, the manipulation orientation is horizontal with respect to the mobile computing device 500. The horizontal manipulation orientation enables independent manipulation of the set of interface icons 508 on a horizontal axis, based on a vertical orientation of the mobile computing device 500 and the formatted search interface 504. By way of further example, the selection of a horizontal manipulation orientation, shown in FIG. 5, enables manipulation of the set of interface icons 508, which is independent of horizontal manipulation of the set of representations 510 and vertical manipulation of the remaining portions of the user interface presented on the display device 502.

With respect to the size value, the search component 250 may determine the display dimensions (e.g., a device type, a screen type, a vertical display value, and a horizontal display value) for the mobile computing device 500 and the display device 502. The search component 250 may also determine display dimensions corresponding to font settings or preferences selected for the mobile computing device 500. The search component 250 determines the size value for the set of interface icons 508 such that the formatted search interface 504 is presented on the display device 502 with combined dimensions configured for presentation on the display device 502. For example, as shown, the formatted search interface 504 is generated with combined dimensions configured to enable display the entirety of the formatted search interface 504, from an upper vertical boundary and a lower vertical boundary, on the display device 502 without swiping or manipulation of the user interface or the display device 502.

The second display characteristic of the set of representations 510 may be similar to the first display characteristic. The second display characteristic may include a relative position value, a size value, a manipulation type, and a manipulation orientation. As described above, the relative position value may indicate a relative position of the set of representations 510 with respect to other portions of information presented in the user interface. The size value may configure one or more of a font size, a representative image size, and an icon size forming representations of secondary database records of the set of representations 510. In some instances, the size value is associated with one or more size threshold, such as a font threshold and an image threshold. The font threshold may ensure that font included in the set of representations is of a suitable presentation size. In some instances, the suitable presentation size corresponds to a minimum font size for the display device 502 or a selected font size above the minimum font size. The suitable presentation size may be based on presentation clarity, such that the font threshold is a font size above which the text may be clearly displayed without distortion. Although described with specific characteristics, it should be understood that other characteristics or aspects of display may be incorporated into selection of the font threshold, and may be based on one or more characteristic of the display device 502. The image threshold may be similar to the font threshold, being a size, pixel count, or set of dimensions above which the representative image may be dearly displayed on the display device 502.

The manipulation type and manipulation orientation may be selected in a manner similar to or the same as described above. In some embodiments, manipulation type and manipulation orientation for the second display characteristic may be selected independent of the first display characteristic. For example, the search component 250 may select a swipe manipulation type and a horizontal manipulation orientation for the first display characteristic while selecting a tap manipulation type (e.g., representations flanked by selectable icons configured to navigate presentation of the set of representations 510) and a horizontal manipulation orientation. By way of farther example, the first display characteristic may be selected with a swipe manipulation type and a horizontal manipulation orientation, while the second display characteristic may be selected with a swipe manipulation type and a vertical manipulation orientation.

In some instances, a combination of the first display characteristic and the second display characteristic may be selected in cooperation, such that the combination of the first display characteristic of the set of interface icons 508 and the second display characteristic of the set of representations 510 cooperate to present the subset of differentiating elements, and the subset of secondary database records are presented in a manner to conserve, limit, or minimize one or more of a vertical height and a horizontal distance of a first carousel or menu and a second carousel or menu presenting the set of interface icons 508 and the set of representations 510, respectively. Similarly, as referenced above, the first display characteristic and the second display characteristic may be selected in cooperation to ensure independent movement, manipulation, and selection of icons, buttons, or interface options from the set of interface icons 508 and the set of representations 510. In some instances one of the display characteristics may be prioritized, such that selection of a manipulation orientation or a manipulation type precludes selection of the same manipulation orientation or manipulation type for the other display characteristic.

In some embodiments, rotation or other orientation changes of the mobile computing device 500, such as rotating from a vertical orientation to a horizontal orientation of the display device 502, causes the search component 250 to reselect or re-determine one or more of the first display characteristic and the second display characteristic. The reselection may be based on detecting transition of a longer distance from a vertical orientation to a horizontal orientation with one or more sensors of the mobile computing device 500. Although the search component 250 is described with reference to orientation changes in devices having uneven screen measurements, it should be understood that the search component 250 may reselect display characteristics based on any suitable changes in orientation, transfer between computing devices (e.g., transfer of display of the formatted search interface from a smartwatch to a smartphone), or any other suitable state or display change.

Although the set of interface icons 508 and the set of representations 510 are presented in swipe or scrollable menus, other menu types may be selectable by the search component 250. For example, in some instances, if a primary database record is hierarchically related (e.g., a child) to a modeled product identifier, differentiating elements for the modeled product identifier at a higher categorical level may be presented in a dropdown or other selectable menu. Similarly, differentiating elements (e.g., color, capacity, memory, or size dimensions) presented within a menu of the set of interface icons 508 may be associated with breadcrumbs indicating branching history or navigation from an initial search to an identified primary database record.

Where a dropdown menu is presented, the search component 250 may identify and populate selectable interface icons for all available elements, differentiating elements, or similarity elements. In some instances, when displayed within a dropdown menu, interface icons for the differentiating elements may be displayed along with status indicators. Status indicators may comprise color, font, shading, or any other suitable visual element to distinguish between the interface icons. The status indicators may represent a selection status of differentiating elements, such as selected, active, and inactive. Where a differentiating element corresponds to a secondary database record currently being displayed, the status may be marked as selected. Where a differentiating element corresponds to a secondary database record available for presentation, the status may indicate the interface icon as active. An inactive status may indicate a differentiating element associated with a categorical relationship, but unassociated with an identified secondary database record.

By way of example, a set of related products is depicted in Table 1, below. A user may initially be presented with a web page for a first product (e.g., ID=1 and Active ID=1A). Selectable interface elements indicating a black color and a 2 GB capacity may be initially selected. The user may then select a color dropdown menu, listing Black, Gold, and Silver as selectable icons. As initially presented, an icon for Black is selected, an icon for Gold is active, and an icon for Silver is inactive. The Silver icon may be inactive due to there being no product associated with a Silver color aspect and a 2 GB capacity aspect. Selection of an icon for Gold causes presentation of a second product (e.g., ID=4 and Active ID=2A). The second product may be presented within a user interface as the primary database record. In some embodiments, upon selection of an icon for Silver, where the icon for 2 GB capacity is still active, the record retrieval system 150 may present a third product (e.g., ID=9 and Active ID=2B), based on the third product satisfying the color selection and having a value greater than or equal to the selected icon for the capacity aspect.

TABLE 1

| Color  | Capacity | ID  | Active ID |
|--------|----------|-----|-----------|
| Black  | 2 GB     | 1   | 1A        |
| Black  | 4 GB     | 2   |           |
| Black  | 8 GB     | n/a |           |
| Gold   | 2 GB     | 4   | 2A        |
| Gold   | 4 GB     | 5   |           |
| Gold   | 8 GB     | 6   |           |
| Silver | 2 GB     | n/a |           |
| Silver | 4 GB     | n/a |           |
| Silver | 8 GB     | 9   | 2B        |

Figure 6:
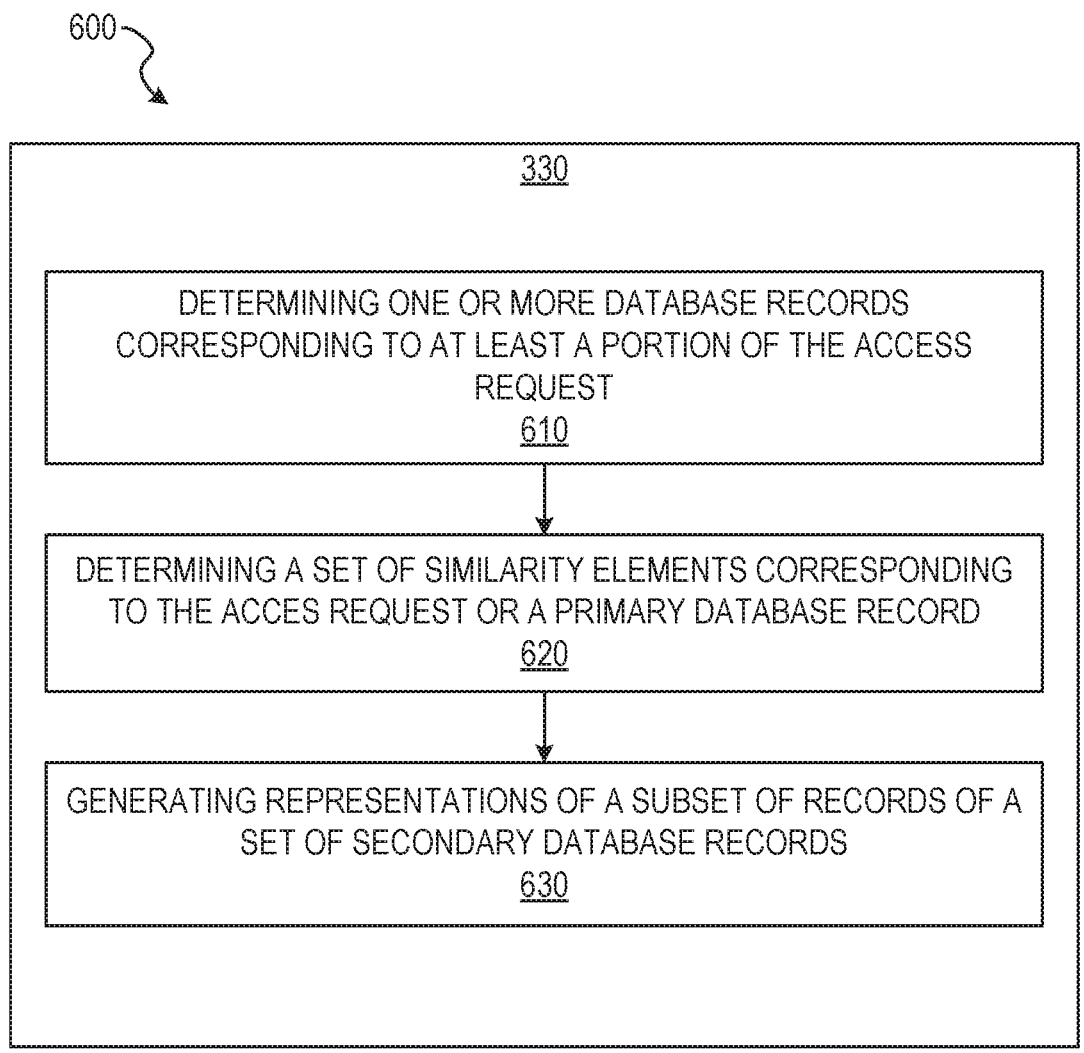
FIG. 6 is a flow diagram illustrating an example method for identifying and retrieving database records and generating a formatted search interface, according to some example embodiments.

In some embodiments, the formatted search interface, as shown in FIGS. 4 and 5, may be generated within a dynamically configurable interface. The dynamically configurable interface may be understood as a master interface, configured to enable wire-on multiple database record design, modification, and presentation. Model-based user interface modifications may be performed, wired-on, or overlaid onto the dynamically configurable interface to correspond to tailored presentations generated for specified users, associated with access requests. For example, where an interaction history of a user corresponds to a multiple top pick model, used to identify and select multiple primary database records, model-based user interface modifications may configure the dynamically configurable interface to present at least a portion of the multiple primary database records, along with the formatted search interface, described above FIG. 6 is a flowchart of operations of the record retrieval system 150 in performing operations of a method 600 of identifying and retrieving database records and generating a formatted search interface, according to various example embodiments. The operations depicted in FIG. 6 may be performed by the record retrieval system 150, using components described above with respect to FIG. 2. In some embodiments, the operations of method 600 may be performed during, as sub-operations of: or in addition to one or more operations of the method 300.

In operation 610, the selection component 230 determines one or more database records corresponding to at least a portion of the access request. In some example embodiments, the one or more database records comprise the set of secondary database records. The one or more database records may also form a subset of the set of secondary database records. In some instances, the set of secondary database records comprise a subset of the one or more database records, such as when the one or more database records include a plurality of database records.

In operation 620, one or more of the selection component 230 and the element component 240 determines a set of similarity elements corresponding to one or more of the access request and the primary database record. The set of similarity elements may be a portion of the set of elements of the one or more database records.

As discussed above, in some example embodiments, each database record comprises information such as categorical and textual descriptions of an item or product, shipping information, condition information, time information (e.g., an availability time, an auction closing time, an auction duration, a sale duration, a shipping time or schedule, or a delivery time), a shipping cost, or any other suitable information. In some instances, one or more words, phrases, formatted selection, term, attribute, or characteristic may be determined, identified, or selected as an element (e.g., a keyword). The elements may be compared to information (e.g., aspects, characteristics, selections, or keywords or phrases) from one or more of the access request and the primary database record. The element component 240, comparing the elements of a potential secondary database record to elements of the primary database record or the access request, may determine a similarity by matching keywords, fuzzy logic or approximate string matching, identifying elements in a common category or hierarchical organization, matching formatted or encoded representations (e.g., a hash) of elements, or any other suitable manner.

In operation 630, the search component 250 generates representations of the subset of records of the set of secondary database records. In some instances, the representations comprise a plurality of representations, where each secondary database record of the subset of records is depicted by a single representation. In some example embodiments, a single representation is generated in place of two or more secondary database records of the subset of records. Each representation may comprise a representative image of a secondary database record and one or more indicators comprising one or more differentiating elements selected from the secondary database record. In some instances, the differentiating elements incorporated into the representation are associated with a specified secondary database record and identified m operation 340 within the set of differentiating elements.

In some embodiments, the representative image is selected or otherwise retrieved from the secondary database record for which the representation is generated. The representative image may also be retrieved from the database 126 or from another database record (e.g., a similar secondary database record). Where the representative image is retrieved from a source other than the secondary database record associated with the representation, the search component 250 or the element component 240 determines, matches, or otherwise compares elements of the secondary database record to elements associated with the representative image to identify the representative image as similar to the secondary database record.

Figure 7:
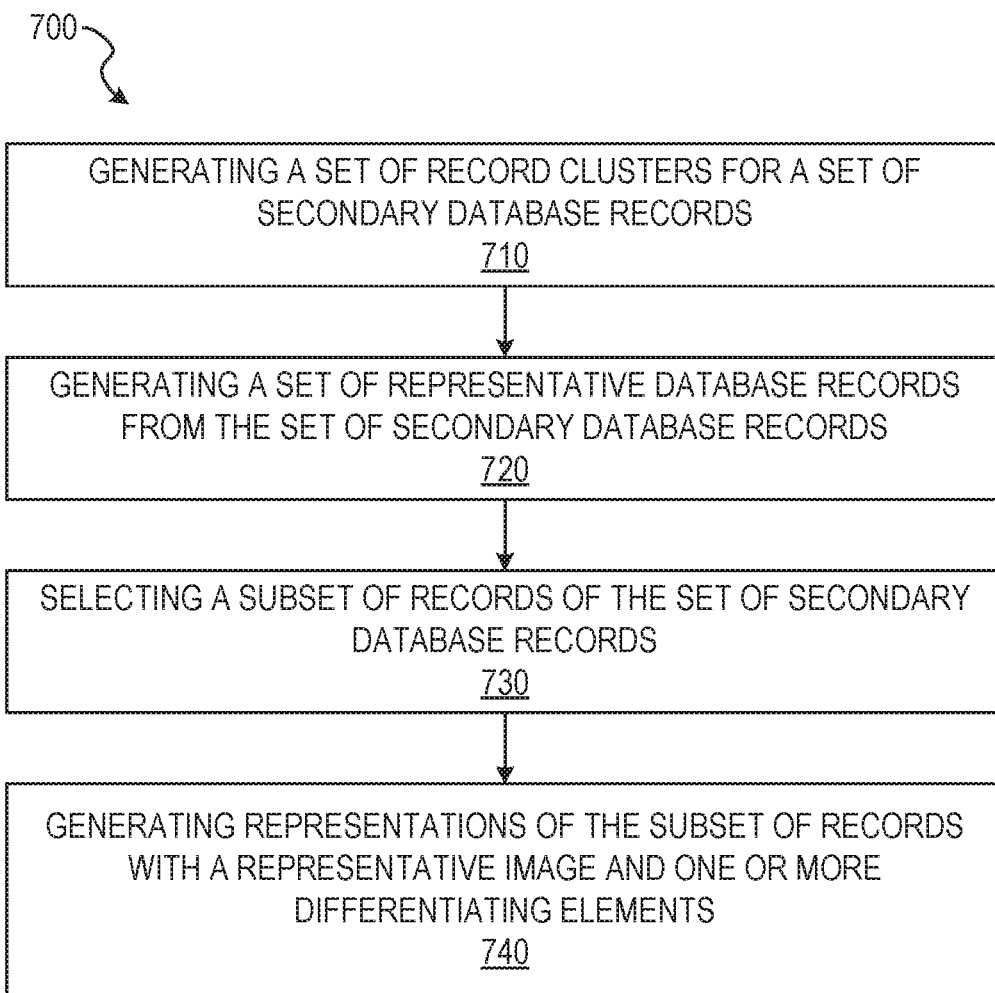
FIG. 7 is a flow diagram illustrating an example method for identifying and retrieving database records and generating a formatted search interface, according to some example embodiments.

FIG. 7 is a flowchart of operations of the record retrieval system 150 in performing operations of a method 700 of identifying and retrieving database records and generating a formatted search interface, according to various example embodiments. The operations depicted in FIG. 7 may be performed by the record retrieval system 150, using components described above with respect to FIG. 2. In some embodiments, the operations of method 700 may be performed during, as sub-operations of: or in addition to one or more operations of the methods 300 or 600.

In operation 710, one or more of the identification component 220, the selection component 230, and the element component 240 generates a set of record clusters for the set of secondary database records. The record clusters correspond to one or more differentiating elements shared by one or more secondary database records of the set of secondary database records.

In operation 720, the selection component 230 generates a set of representative database records by selecting a representative database record, of the set of secondary database records, for each record cluster of the set of record clusters. The representative database record may be selected for a record cluster based on the representative database record including a differentiating element used to identify the record cluster. In some instances, the representative database record may include elements, in addition to the differentiating element, which are similar to or match elements of the access request or the primary database record. For example, a secondary database record may be selected as a representative database record where all of the elements of the secondary database record match the primary database record or the access request, with the exception of a single differentiating element corresponding to the record cluster.

In operation 730, the search component 250 selects the subset of records of the set of secondary database records. In some example embodiments, the subset of records comprises one or more representative database records of the set of representative database records. Each secondary record selected for inclusion in the subset of records may correspond to a different record cluster of the set of record clusters.

In operation 740, the search component 250 generates the representations of the subset of records. Each representation comprises a representative image of a representative database record and one or more indicators corresponding to the one or more differentiating elements of a record cluster associated with the representative database record. In some instances, the search component 250 may generate the representations in a manner similar to or the same as described above with respect to operations 350 or 630. In embodiments where the set of record clusters has been generated, the search component 250 generates the set of selectable interface icons such that each selectable interface icon represents a differentiating element corresponding to a cluster of the set of record clusters.

Figure 8:
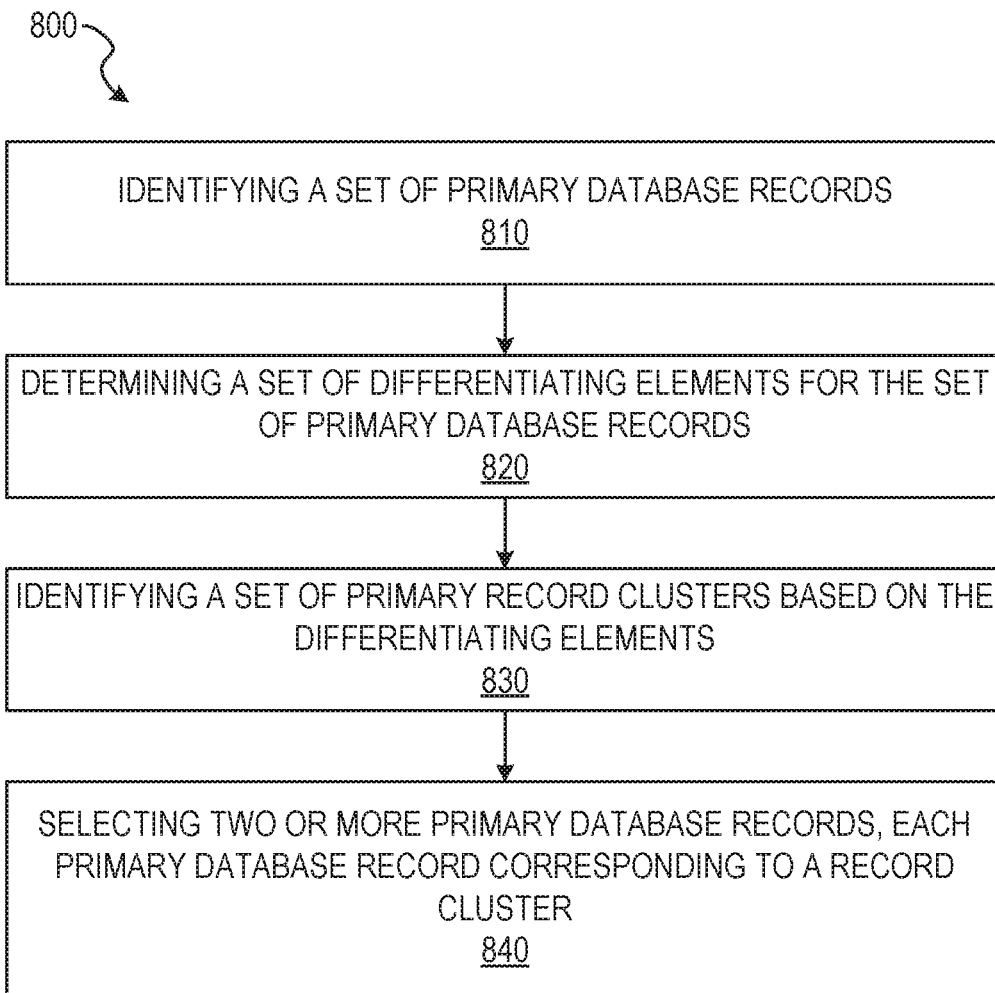
FIG. 8 is a flow diagram illustrating an example method for identifying and retrieving database records and generating a formatted search interface, according to some example embodiments.

FIG. 8 is a flowchart of operations of the record retrieval system 150 in performing operations of a method 800 of identifying and retrieving database records through manipulation of a formatted search interface, according to various example embodiments. The operations depicted in FIG. 8 may be performed by the record retrieval system 150, using components described above with respect to FIG. 2. In some embodiments, the operations of method 800 may be performed during, as sub-operations of, or in addition to one or more operations of the methods 300, 600, or 700.

In operation 810, the identification component 220 identifies a set of primary database records. The record retrieval system 150 may identify the set of primary database records by determining a plurality of database records corresponding to the access request. Each primary database record comprises a set of elements. The set of primary database records may be understood as multiple top picks selected in response to receiving the access request. In some embodiments, the set of primary database records represents database records having a match value above a predetermined threshold value. For example, the identification component 220 may identify the set of primary database records by comparing the elements (e.g., keywords and item description) of each primary database record with elements, aspects, or characteristics of the access request, such as keywords of a user-generated or formatted search query. In some instances, the set of primary database records represents featured database records.

In operation 820, the element component 240 determines a set of differentiating elements for the set of primary database records. In some embodiments, the set of differentiating elements may be determined or identified in a manner similar to or the same as described above, with respect to operation 340.

In operation 830, the element component 240 identifies a set of primary record clusters based on the set of differentiating elements determined in operation 820. Each primary record cluster may correspond to one or more primary database records of the set of primary database records. In some embodiments, the set of primary record clusters may be identified in a manner similar to or the same as described above, with respect to method 700.

In operation 840, the selection component 230 selects two or more primary database records for inclusion in the set of primary database records. Each selected primary database record corresponds to a record cluster of the set of primary record clusters. In some embodiments, operation 840 causes the search component 250 to generate a publication interface page (e.g., publication interface page 410) displaying all or a portion of the two or more primary database records. The two or more primary database records may be presented as similar or tiered. In instances where primary database records are presented as tiered, a first primary database record may be a specified matching database record featured as a closest match to an access request containing the elements similar to those in the first primary database record. The second or subsequent primary database records may be presented as similar records, incorporating at least one of the differentiating elements. The second or subsequent primary database records may provide an overview of available primary database records of the set of primary database records or the set of primary record clusters.

Figure 9:
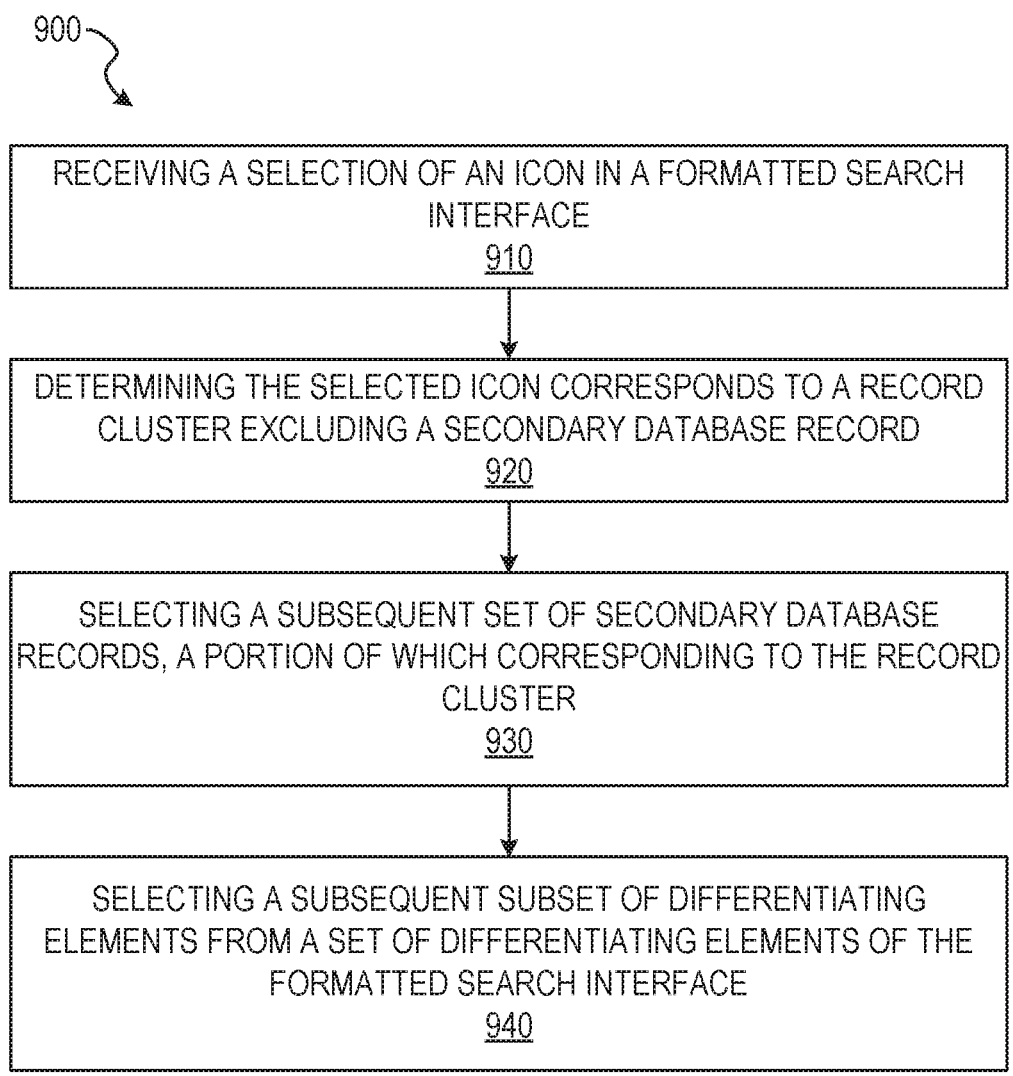
FIG. 9 is a flow diagram illustrating an example method for identifying and retrieving database records and generating a formatted search interface, according to some example embodiments.

FIG. 9 is a flowchart of operations of the record retrieval system 150 in performing operations of a method 900 of identifying and retrieving database records through manipulation of a formatted search interface, according to various example embodiments. The operations depicted in FIG. 9 may be performed by the record retrieval system 150, using components described above with respect to FIG. 2. In some embodiments, the operations of method 900 may be during, as sub-operations of, or in addition to one or more operations of the methods 300, 600, 700, or 800.

Figure 10:
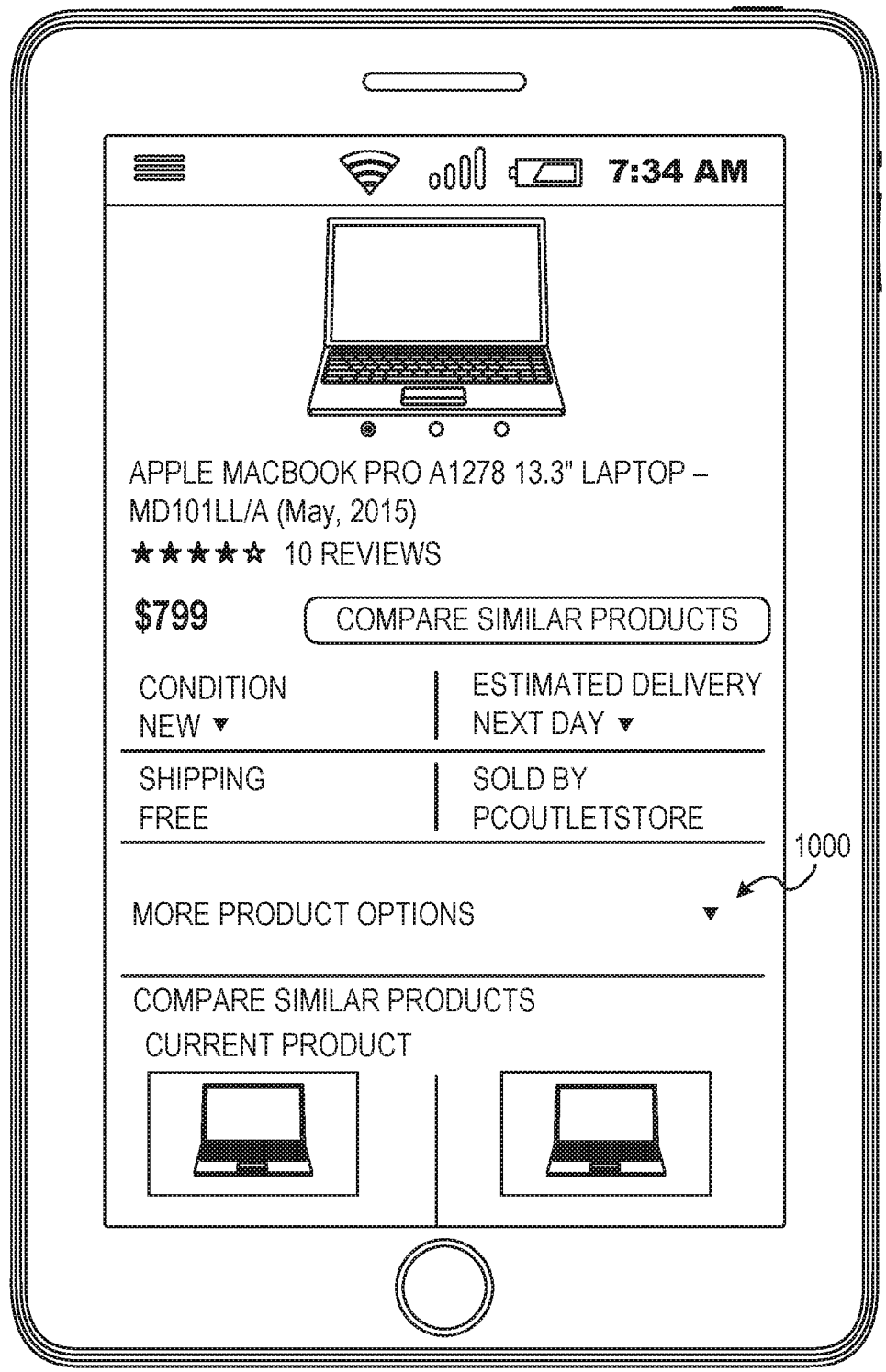
FIG. 10 is an example interface diagram illustrating a user interface screen of a record retrieval system, according to some example embodiments.
Figure 11:
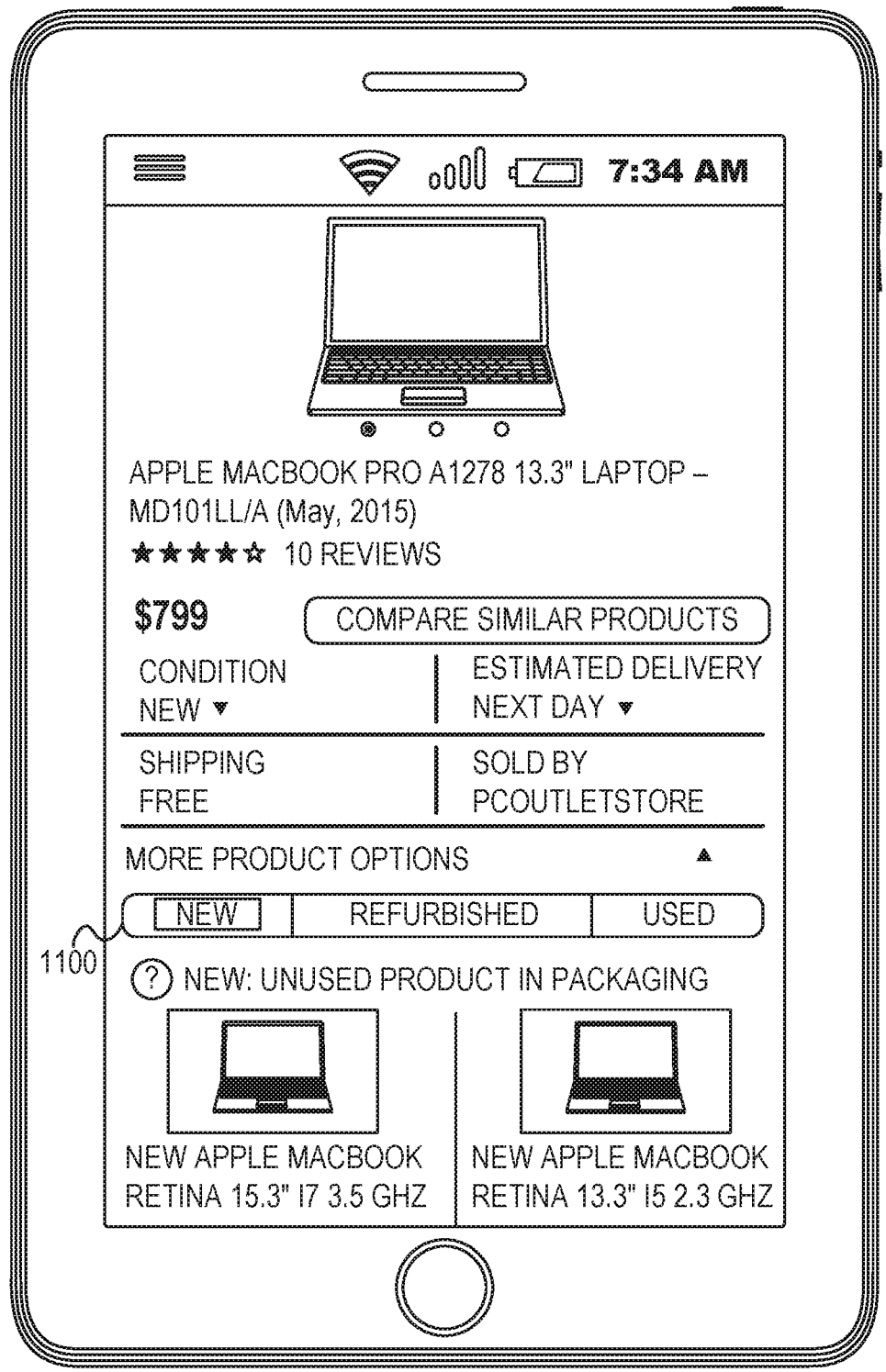
FIG. 11 is an example interface diagram illustrating a user interface screen of a record retrieval system, according to some example embodiments.
Figure 12:
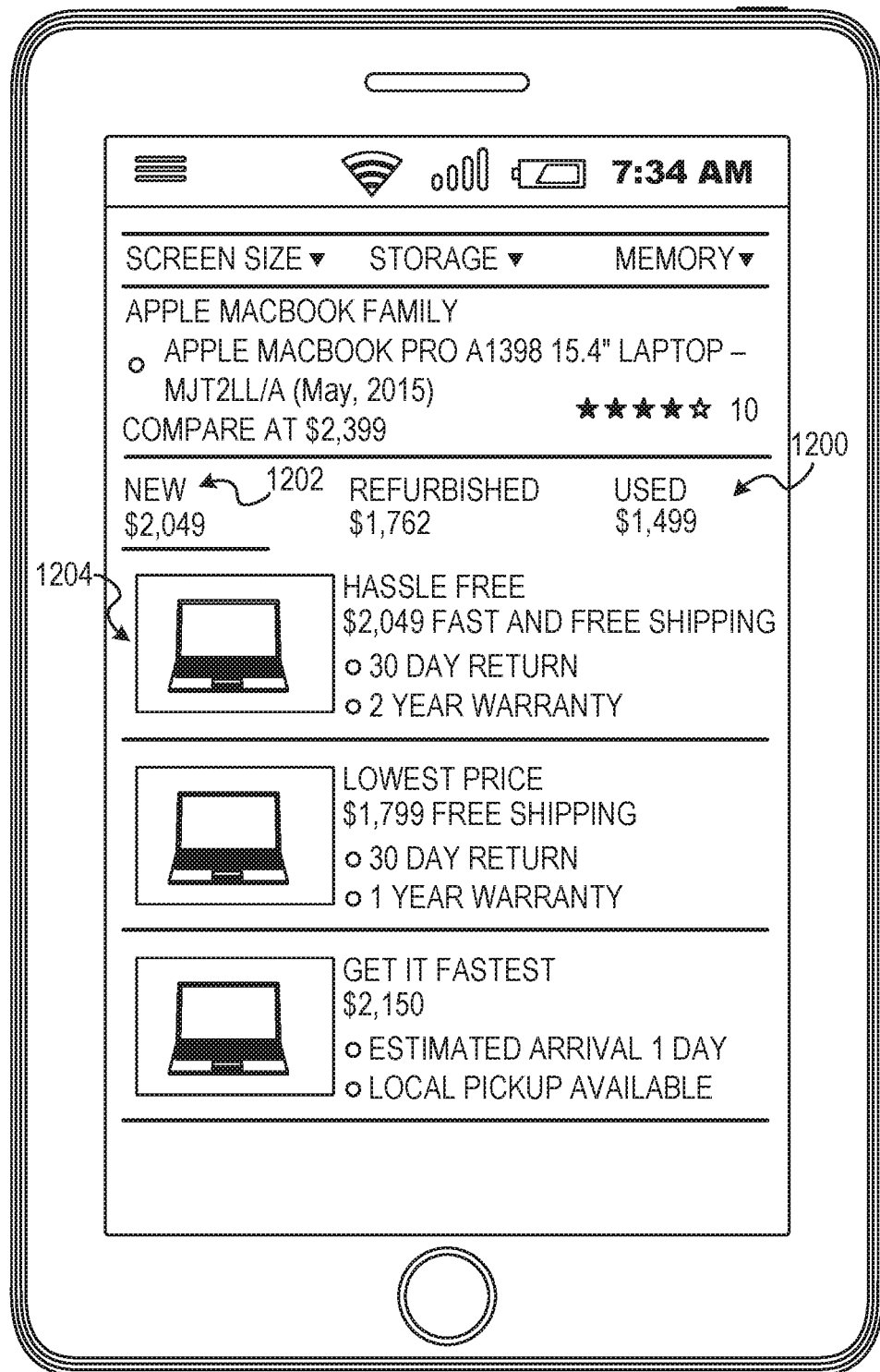
FIG. 12 is an example interface diagram illustrating a user interface screen of a record retrieval system, according to some example embodiments.
Figure 13:
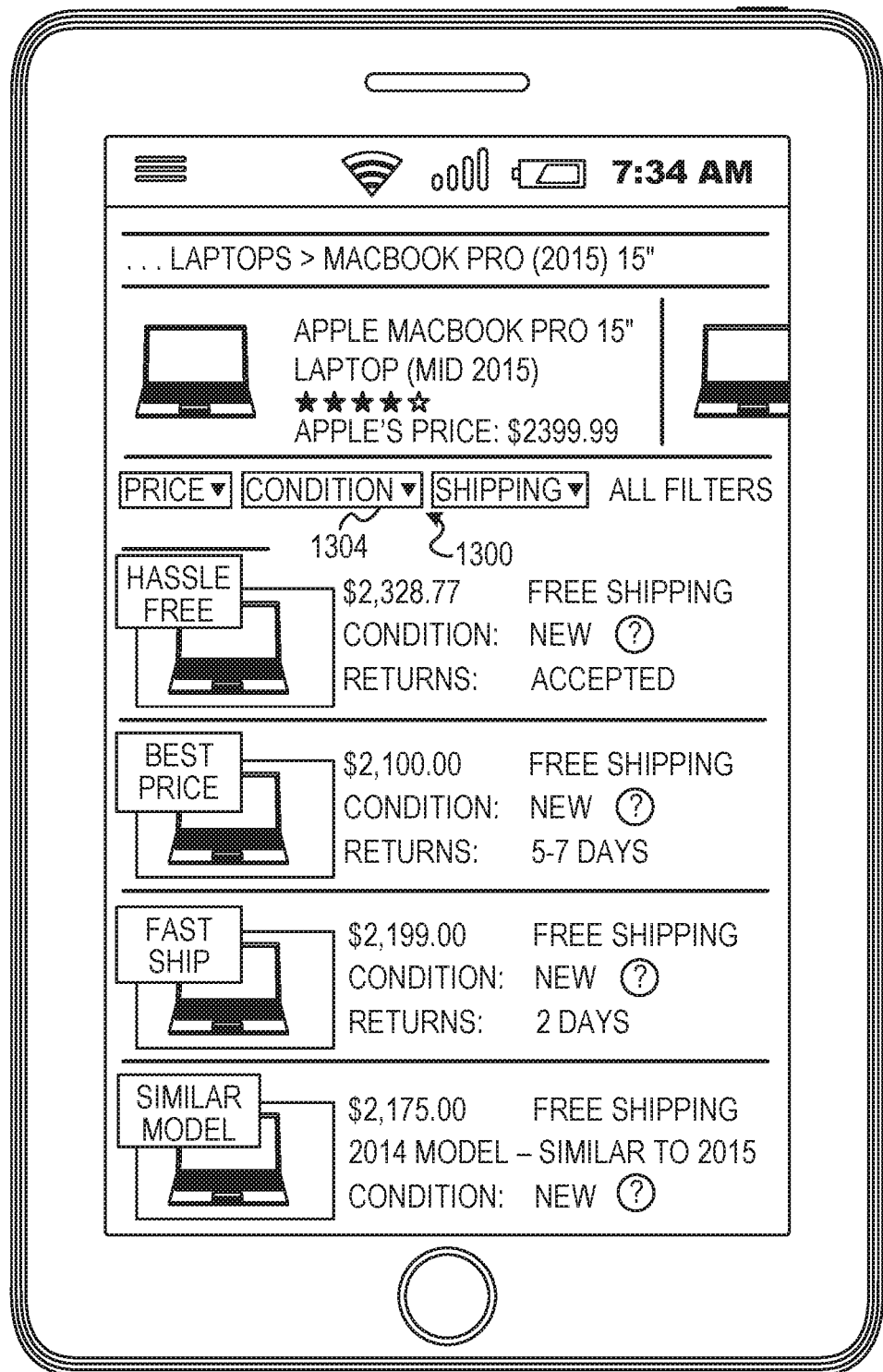
FIG. 13 is an example interface diagram illustrating a user interface screen of a record retrieval system, according to some example embodiments.
Figure 14:
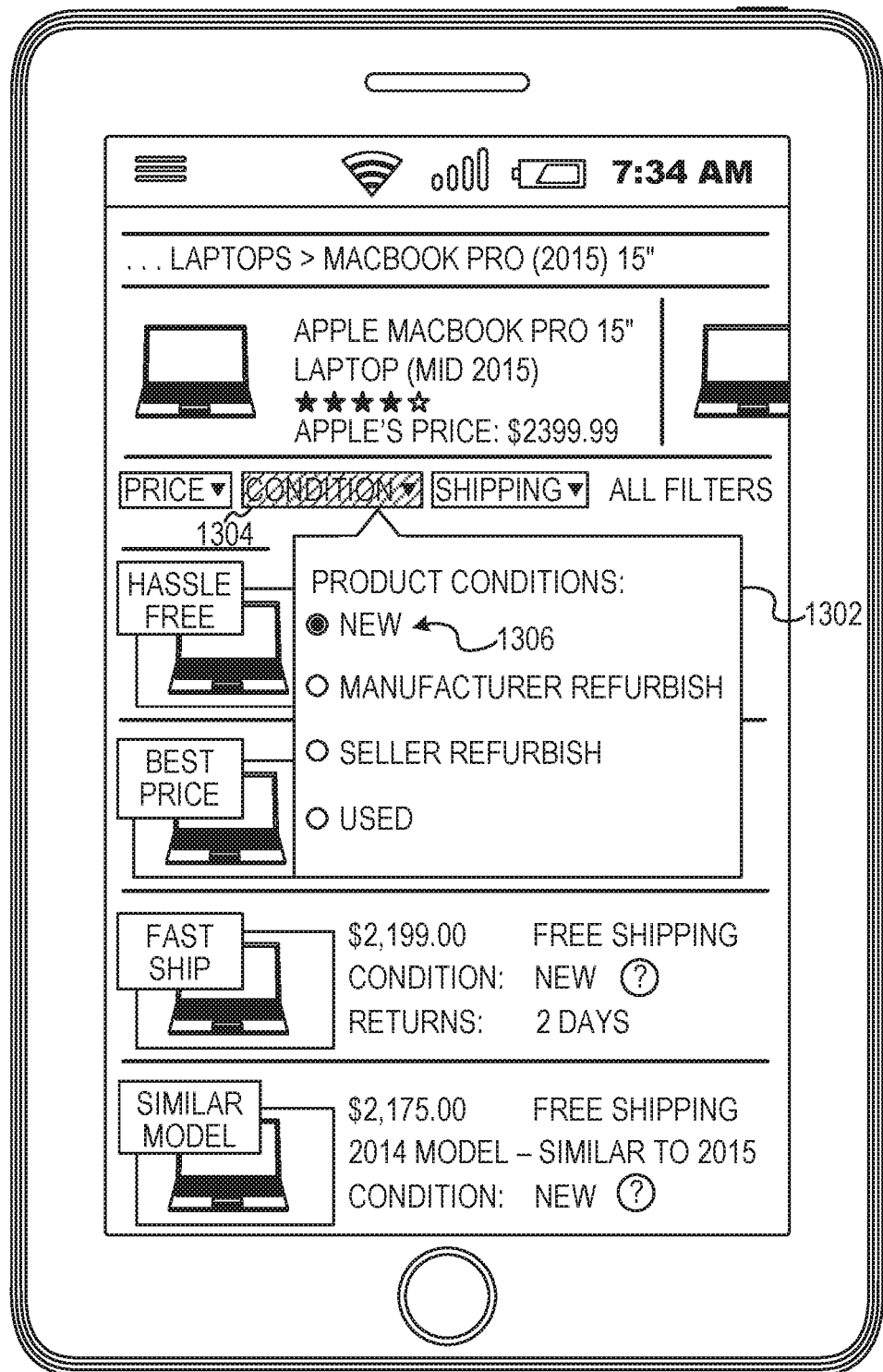
FIG. 14 is an example interface diagram illustrating a user interface screen of a record retrieval system, according to some example embodiments.

In operation 910, the access component 210 receives selection of an icon of the set of selectable interface icons. Selection of the icon may be received through an input device, such as a touchscreen, a keyboard, a mouse, or any other suitable input. The icon selection may be received after an initial generation and presentation of one or more of a formatted search interface and a primary database record. In some embodiments, as shown in FIGS. 10 and 11, icons 1000 may be presented. A selected icon may represent a themed filter 1100 (FIG. 11) selecting a specified differentiating element configured to identify similar or comparable database records. As shown in FIG. 12, selectable interface icons 1200 may correspond to a differentiating element 1202 of condition, with each value or variation of the differentiating element 1202 having corresponding secondary database records 1204. As shown in FIGS. 13 and 14, selection of an icon may involve multiple selections. A first selection of an icon 1300 (FIG. 13) may provide a menu 1302 (FIG. 14) of values or options for a differentiating element 1304, and a second selection may select an icon 1306 (FIG. 14) associated with a specified value, term, or variation of the differentiating element 1304 selected from the menu 1302.

Interaction with a publication interface page (e.g., publication interface page 410) may enable interaction and selection of icons using one or more of a display device and a mobile computing device (e.g., the client device 110), software as a service, server calls, application programming interface calls, or any other suitable internal or distributed processing. where the record retrieval system 150 uses software as a service, repeated or multiple calls to the software as a service may be performed to select presented database records (e.g., the primary database record and subset of secondary database records). Each presented database record may have a highest ranking for database records identified by a software as a service call. Each software as a service call, used to identify and select database records, may correspond to a different filter or elements. Such calls may be generated iteratively in some instances.

In operation 920, the search component 250 determines that the selected icon corresponds to a record cluster excluding one or more of the secondary database records of the subset of secondary database records associated with the representations. For example, where an interface icon corresponds to a differentiating element having an inactive status, the differentiating element may correspond to a database record or record cluster of all or a portion of the set of secondary database records. The inactive interface element may be greyed or otherwise colored or highlighted to indicate an inactive status. The inactive interface element may remain selectable, despite an inactive status. In some instances, upon selection of the inactive interface icon, the search component 250 or the element component 240 may lock the differentiating element.

In operation 930, the selection component 230 selects a subsequent set of secondary database records comprising a first portion of second database records corresponding to the record cluster of the selected icon. In some embodiments, the selection component 230 selects a second portion of second database records corresponding to one or more differentiating elements unassociated with the record cluster of the selected icon. As described above with respect to a selected and locked differentiating element, the selection component 230 or the element component 240 may select the subsequent database records by changing or removing similarity elements or differentiating elements used in one or more previous queries or access requests. The elements changed in response to locking the selected differentiating element may be incompatible with the locked element. For example, where an inactive interface icon for 256-gigabyte memory storage is selected and locked, the element is added into an existing search query or access request. An element, such as 64-gigabyte memory storage, which overlaps or conflicts with the locked element, may be removed from the subsequently generated access request or search query.

In operation 940, the element component 240 selects a subsequent subset of differentiating elements from the set of differentiating elements identified for the set of secondary database records. Selection of the subsequent subset of differentiating elements may be performed in a manner similar to or the same as described above, with respect to operations 340 or 820.

According to various example embodiments, one or more of the methodologies described herein may facilitate identification of keyword and publication rankings as well as automatic or semi-automatic selection of publications (e.g., web pages included in the publication system 142) or database records. Various embodiments generate a theoretically optimized distribution of representative database records giving a complete but representational view of an inventory of database records within a database. Accordingly, one or more of the methodologies described herein may have the effect of allowing a user to navigate and optimally (e.g., theoretically optimal navigation and identification) identify a range of database records, whether complete or incomplete, selected based on differentiating elements.

As a result, one or more of the methodologies described herein may obviate a need for certain efforts or resources that otherwise would be involved in research, decision-making, database record retrieval, and more. Efforts expended by a user in identifying a publication within a set of results may be reduced and more accurately determined based on the methodologies described herein. Efforts expended to optimize database record retrieval for presentation by search engines may be reduced or eliminated by one or more of the methodologies described herein. Computing resources used by one or more machines, databases, or devices may similarly be reduced. Examples of such computing resources include processor cycles, network traffic, memory usage, data storage capacity, power consumption, and cooling capacity. Specifically, computing resources used by machines, being directed by interactions of a user, to generate or modify existing or new content are reduced.

EXAMPLES

To better illustrate the apparatus and methods disclosed herein, a non-limiting list of examples is provided herein:

1. A system comprising one or more processors; and a machine-readable storage device comprising processor-executable instructions that, when executed by the one or more processors, cause the one or more processors to perform operations comprising: receiving, by the one or more processors, an access request for database records of a network-based publication system, the database records stored on a database coupled to the network-based publication system; identifying, by the one or more processors, a primary database record corresponding to the access request; selecting, by the one or more processors, a set of secondary database records corresponding to the access request, the set of secondary database records including a set of elements distinguishing the set of secondary database records from the primary database record; determining, by the one or more processors, a set of differentiating elements within records of the set of secondary database records, each differentiating element distinguishing at least one record of the set of secondary database records from one or more of the primary database record and a portion of the records included in the set of secondary database records; determining, by the one or more processors, a set of differentiating elements within records of the set of secondary database records, each differentiating element distinguishing at least one record of the set of secondary database records from one or more of the primary database record and a portion of the records included in the set of secondary database records; generating, by the one or more processors, a formatted search interface including a representation of the primary database record, representations of a subset of records of the set of secondary database records, and a set of selectable interface icons representing one or more differentiating elements of the set of differentiating elements; and causing presentation of the formatted search interface at a client device associated with the access request.

2. The system of example 1, wherein selecting the set of secondary database records further comprises determining one or more database records corresponding to at least a portion of the access request, the one or more database records comprising the set of secondary database records, each database record of the one or more database records comprising a set of elements; and determining, for the one or more database records, a set of similarity elements corresponding to one or more of the access request and the primary database record, the set of similarity elements being a portion of the set of elements of the one or more database records.

3. The system of examples 1 or 2, wherein generating the formatted search interface further comprises generating the representations of the subset of records of the set of secondary database records, wherein each representation comprises a representative image of a secondary database record and one or more indicators comprising one or more differentiating elements selected from the secondary database record.

4. The system of any one or more of examples 1-3, wherein generating the formatted search interface further comprises generating a set of record clusters for the set of secondary database records, the clusters corresponding to one or more differentiating elements shared by one or more secondary database records; and generating a set of representative database records by selecting a representative database record for each record cluster of the set of record clusters.

5. The system of any one or more of examples 1-4, wherein generating the formatted search interface further comprises selecting the subset of records of the set of secondary database records, the subset of records being one or more representative database records of the set of representative database records; and generating the representations of the subset of records, wherein each representation comprises a representative image of a representative database record and one or more indicators corresponding to the one or more differentiating elements of a record cluster associated with the representative database record.

6. The system of any one or more of examples 1-5, wherein generating the formatted search interface further comprises identifying a display dimension of a display device coupled to the client device; based on the display dimension, determining a first display characteristic for the set of selectable interface icons, the first display characteristic configured to enable manipulation of the set of selectable interface icons independent of manipulation of a remaining portion of the formatted search interface; and based on the display dimension, determining a second display characteristic for the representations of the subset of records of the set of secondary database records, the second display characteristic configured to enable manipulation of the subset of records independent of the set of selectable icons and the portion of the formatted search interface.

7. The system of any one or more of examples 1-6, wherein the primary database record is a set of primary database records and identifying the set of primary database records further comprises determining a plurality of database records corresponding to the access request each primary database record comprising a set of elements; determining a set of differentiating elements for the set of primary database records; based on the set of differentiating elements, identifying a set of primary record clusters, each cluster corresponding to one or more primary database record of the set of primary database records; and selecting two or more primary database records for inclusion in the set of primary database records, each selected primary database record corresponding to a record cluster of the set of primary record clusters.

8. The system of any one or more of examples 1-7, wherein the operations further comprise receiving selection of an icon of the set of selectable interface icons; determining the selected icon corresponds to a record cluster excluding one or more of the secondary database records of the subset of secondary database records associated with the representations; selecting a subsequent set of secondary database records comprising a first portion of second database records corresponding to the record cluster of the selected icon and a second portion of second database records corresponding to one or more differentiating elements unassociated with the record cluster of the selected icon; and selecting a subsequent subset of differentiating elements from the set of differentiating elements identified for the set of secondary database records.

9. A method comprising receiving, by one or more processors, an access request for database records of a network-based publication system, the database records stored on a database coupled to the network-based publication system; identifying, by the one or more processors, a primary database record corresponding to the access request; selecting, by the one or more processors, a set of secondary database records corresponding to the access request, the set of secondary database records including a set of elements distinguishing the set of secondary database records from the primary database record; determining, by the one or more processors, a set of differentiating elements within records of the set of secondary database records, each differentiating element distinguishing at least one record of the set of secondary database records from one or more of the primary database record and a portion of the records included in the set of secondary database records; generating, by the one or more processors, a formatted search interface including a representation of the primary database record, representations of a subset of records of the set of secondary database records, and a set of selectable interface icons representing one or more differentiating elements of the set of differentiating elements; and causing presentation of the formatted search interface at a client device associated with the access request.

10. The method of example 9, wherein selecting the set of secondary database records further comprises determining one or more database records corresponding to at least a portion of the access request, the one or more database records comprising the set of secondary database records, each database record of the one or more database records comprising a set of elements; and determining, for the one or more database records, a set of similarity elements corresponding to one or more of the access request and the primary database record, the set of similarity elements being a portion of the set of elements of the one or more database records.

11. The method of examples 9 or 10, wherein generating the formatted search interface further comprises generating the representations of the subset of records of the set of secondary database records, wherein each representation comprises a representative image of a secondary database record and one or more indicators comprising one or more differentiating elements selected from the secondary database record.

12. The method of any one or more of examples 9-11, wherein generating the formatted search interface further comprises generating a set of record clusters for the set of secondary database records, the clusters corresponding to one or more differentiating elements shared by one or more secondary database records; and generating a set of representative database records by selecting a representative database record for each record cluster of the set of record clusters.

13. The method of any one or more of examples 9-12, wherein generating the formatted search interface further comprises selecting the subset of records of the set of secondary database records, the subset of records being one or more representative database records of the set of representative database records; and generating the representations of the subset of records, wherein each representation comprises a representative image of a representative database record and one or more indicators corresponding to the one or more differentiating elements of a record cluster associated with the representative database record.

14. The method of any one or more of examples 9-13, wherein each selectable interface icon representing a differentiating element corresponds to a cluster of the set of record clusters.

15. The method of any one or more of examples 9-14, wherein generating the formatted search interface further comprises identifying a display dimension of a display device coupled to the client device; based on the display dimension, determining a first display characteristic for the set of selectable interface icons, the first display characteristic configured to enable manipulation of the set of selectable interface icons independent of manipulation of a remaining portion of the formatted search interface; and based on the display dimension, determining a second display characteristic for the representations of the subset of records of the set of secondary database records, the second display characteristic configured to enable manipulation of subset of records independent of the set of selectable icons and the portion of the formatted search interface.

16. The method of any one or more of examples 9-15, wherein the first display characteristic comprises a first scrolling orientation, a dimension threshold, and a set value indicating a number of selectable interface icons to be included in the set of selectable interface icons.

17. The method of any one or more of examples 9-16, wherein the primary database record is a set of primary database records and identifying the set of primary database records further comprises determining a plurality of database records corresponding to the access request, each primary database record comprising a set of elements; determining a set of differentiating elements for the set of primary database records; based on the set of differentiating elements, identifying a set of primary record clusters, each cluster corresponding to one or more primary database record of the set of primary database records; and selecting two or more primary database records for inclusion in the set of primary database records, each selected primary database record corresponding to a record cluster of the set of primary record clusters.

18. The method of any one or more of examples 9-17, further comprising receiving selection of an icon of the set of selectable interface icons; determining the selected icon corresponds to a record cluster excluding one or more of the secondary database records of the subset of secondary database records associated with the representations; selecting a subsequent set of secondary database records comprising a first portion of second database records corresponding to the record cluster of the selected icon and a second portion of second database records corresponding to one or more differentiating elements unassociated with the record cluster of the selected icon; and selecting a subsequent subset of differentiating elements from the set of differentiating elements identified for the set of secondary database records.

19. A machine-readable storage medium comprising processor-executable instructions that, when executed by a processor of a machine, cause the machine to perform operations comprising receiving, by one or more processors, an access request for database records of a network-based publication system, the database records stored on a database coupled to the network-based publication system; identifying, by the one or more processors, a primary database record corresponding to the access request; selecting, by the one or more processors, a set of secondary database records corresponding to the access request, the set of secondary database records including a set of elements distinguishing the set of secondary database records from the primary database record; determining, by the one or more processors, a set of differentiating elements within records of the set of secondary database records, each differentiating element distinguishing at least one record of the set of secondary database records from one or more of the primary database record and a portion of the records included in the set of secondary database records; generating, by the one or more processors, a formatted search interface including a representation of the primary database record, representations of a subset of records of the set of secondary database records, and a set of selectable interface icons representing one or more differentiating elements of the set of differentiating elements; and causing presentation of the formatted search interface at a client device associated with the access request.

20. The machine-readable storage medium of example 19, wherein the operations further comprise determining one or more database records corresponding to at least a portion of the access request, the one or more database records comprising the set of secondary database records, each database record of the one or more database records comprising a set of elements; determining, for the one or more database records, a set of similarity elements corresponding to one or more of the access request and the primary database record, the set of similarity elements being a portion of the set of elements of the one or more database records; generating a set of record clusters for the set of secondary database records, the clusters corresponding to one or more differentiating elements shared by one or more secondary database records; and generating a set of representative database records by selecting a representative database record for each record cluster of the set of record clusters.

21 A machine-readable medium carrying processor-executable instructions that, when executed by one or more processors of a machine, cause the machine to carry out the method of any one or more of examples 9-18.

These and other examples and features of the present apparatus and methods are set forth above in part in the Detailed Description. The Summary and the Examples are intended to provide non-limiting examples of the present subject matter. It is not intended to provide an exclusive or exhaustive explanation. The Detailed Description is included to provide further information about the present subject matter.

Modules, Components, and Logic

Certain embodiments are described herein as including logic or a number of components, modules, or mechanisms. Modules may constitute either software modules (e.g., code or processor executable instructions embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments m which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, components, methods, applications and so forth described in conjunction with FIGS. 1-14 are implemented in some embodiments in the context of a machine and an associated software architecture, a client/server architecture, or any other suitable architecture incorporating one or more systems or user devices. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here as those of skill in the art can readily understand how to implement the inventive subject matter in different contexts from the disclosure contained herein.

Software Architecture

Figure 15:
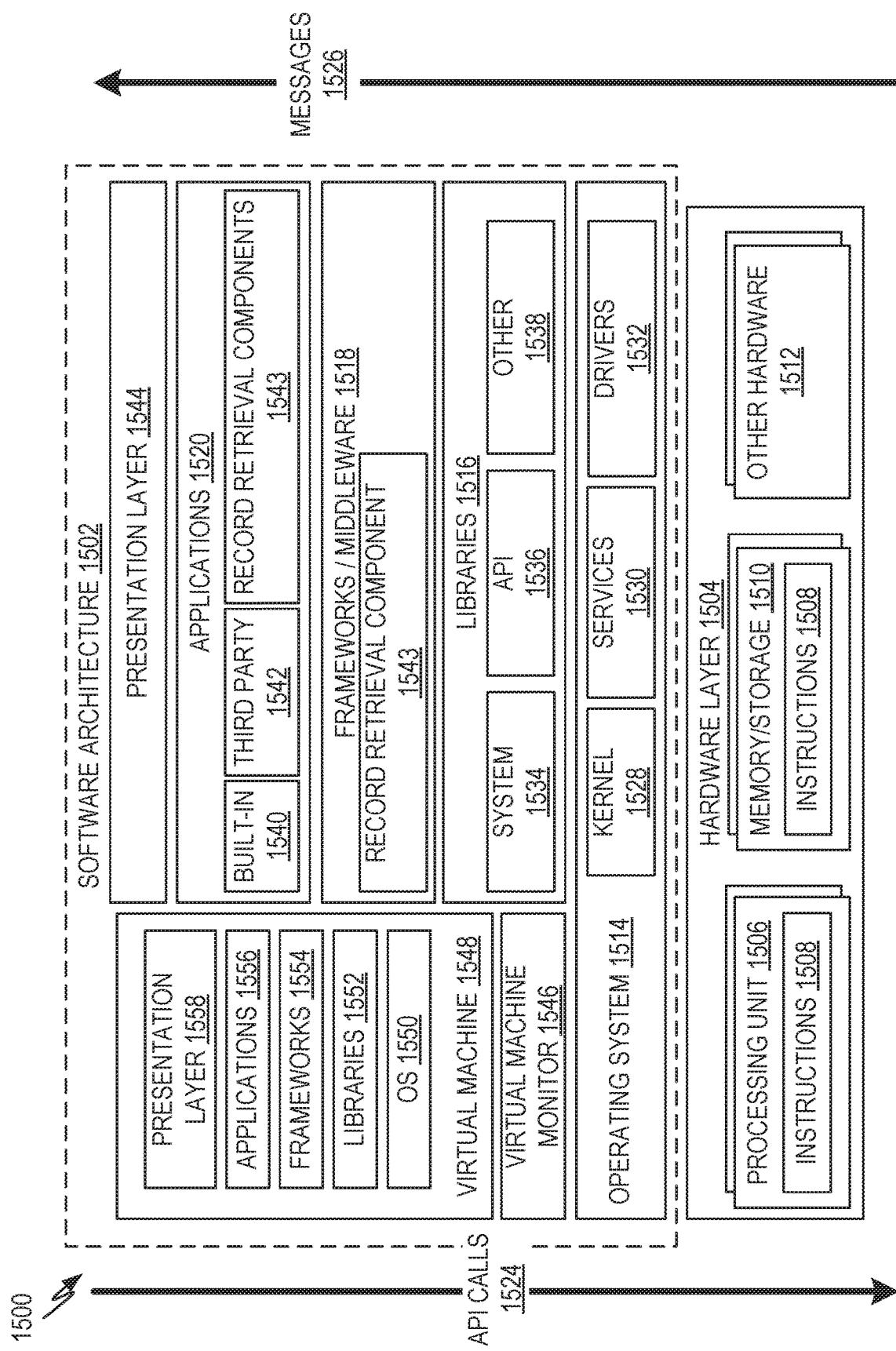
FIG. 15 is a block diagram illustrating an example of a software architecture that may be installed on a machine, according to some example embodiments.

FIG. 15 is a block diagram 1500 illustrating a representative software architecture 1502, which may be used in conjunction with various hardware architectures herein described. FIG. 15 is merely a non-limiting example of a software architecture and it will be appreciated that many other architectures may be implemented to facilitate the functionality described herein. The software architecture 1502 may be executing on hardware such as machine 1600 of FIG. 16 that includes, among other things, processors 1610, memory 1630, and I/O components 1650. A representative hardware layer 1504 is illustrated and can represent, for example, the machine 1600 of FIG. 16. The representative hardware layer 1504 comprises one or more processing units 1506 having associated executable instructions 1508. Executable instructions 1508 represent the executable instructions of the software architecture 1502, including implementation of the methods, modules and so forth of FIGS. 1-14. Hardware layer 1504 also includes memory and/or storage modules 1510, which also have executable instructions 1508. Hardware layer 1504 may also comprise other hardware 1512, which represents any other hardware of the hardware layer 1504, such as the other hardware illustrated as part of machine 1600.

In the example architecture of FIG. 15, the software architecture 1502 may be conceptualized as a stack of layers where each layer provides particular functionality. For example, the software architecture 1502 may include layers such as an operating system 1514, libraries 1516, frameworks/middleware 1518, applications 1520 and presentation layer 1544. Operationally, the applications 1520 and/or other components within the layers may invoke application programming interface (API) calls 1524 through the software stack and receive a response, returned values, and so forth illustrated as messages 1526 in response to the API calls 1524. The layers illustrated are representative in nature and not all software architectures have all layers. For example, some mobile or special purpose operating systems may not provide a frameworks/middleware layer 1518, while others may provide such a layer. Other software architectures may include additional or different layers.

The operating system 1514 may manage hardware resources and provide common services. The operating system 1514 may include, for example, a kernel 1528, services 1530, and drivers 1532. The kernel 1528 may act as an abstraction layer between the hardware and the other software layers. For example, the kernel 1528 may be responsible for memory management, processor management (e.g., scheduling), component management, networking, security settings, and so on. The services 1530 may provide other common services for the other software layers. The drivers 1532 may be responsible for controlling or interfacing with the underlying hardware. For instance, the drivers 1532 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1516 may provide a common infrastructure that may be utilized by the applications 1520 and/or other components and/or layers. The libraries 1516 typically provide functionality that allows other software modules to perform tasks in an easier fashion than to interface directly with the underlying operating system 1514 functionality (e.g., kernel 1528, services 1530 and/or drivers 1532). The libraries 1516 may include system libraries 1 534 (e.g., C standard library) that may provide functions such as memory allocation functions, string manipulation functions, mathematic functions, and the like. In addition, the libraries 1516 may include API libraries 1536 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., Web Kit that may provide web browsing functionality), and the like. The libraries 1516 may also include a wide variety of other libraries 1 538 to provide many other APIs to the applications 1520 and other software components/modules.

The frameworks 1518 (also sometimes referred to as middleware) may provide a higher-level common infrastructure that may be utilized by the applications 1520 and/or other software components/modules. For example, the frameworks 1518 may provide various graphic user interface (GUI) functions, high-level resource management, high-level location services, and so forth. The frameworks 1518 may provide a broad spectrum of other APIs that may be utilized by the applications 1520 and/or other software components/modules, some of which may be specific to a particular operating system or platform. In some example embodiments, record retrieval components 1543 (e.g., one or more components of the record retrieval system 150) may be implemented at least in part within the middleware/frameworks 1518.

The applications 1520 include built-in applications 1540 and/or third-party applications 1542, or record retrieval components 1543. Examples of representative built-in applications 1540 may include, but are not limited to, a contacts application, a browser application, a book reader application, a location application, a media application, a messaging application, and/or a game application Third-party applications 1542 may include any of the built-in applications 1540 as well as a broad assortment of other applications. In a specific example, the third-party application 1542 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1542 may invoke the A.PI calls 1524 provided by the mobile operating system such as operating system 1514 to facilitate functionality described herein. In various example embodiments, the user-facing portions of the record retrieval components 1543 may include one or more components or portions of components described above with respect to FIG. 2. For example, in some instances, portions of the access component 210, the identification component 220, the selection component 230, the element component 240, the search component 250, and the presentation component 260 associated with user interface elements (e.g., data entry and data output functions) may be implemented in the form of an application.

The applications 1520 may utilize built-in operating system functions (e.g., kernel 1528, services 1530 and/or drivers 1532), libraries (e.g., system libraries 1534, API libraries 1536, and other libraries 1538), frameworks/middleware 1518 to create user interfaces to interact with users of the system. Alternatively, or additionally, in some systems interactions with a user may occur through a presentation layer, such as presentation layer 1544. In these systems, the application/module "logic" can be separated from the aspects of the application/module that interact with a user.

Some software architectures utilize virtual machines. In the example of FIG. 15, this is illustrated by virtual machine 1548. A virtual machine creates a software environment where applications/modules can execute as if they were executing on a hardware machine (such as the machine of FIG. 16, for example). A virtual machine is hosted by a host operating system (operating system 1514 in FIG. 15) and typically, although not always, has a virtual machine monitor 1546, which manages the operation of the virtual machine 1548 as well as the interface with the host operating system (i.e., operating system 1514). A software architecture executes within the virtual machine 1548 such as an operating system 1550, libraries 1552, frameworks/middleware 1554, applications 1556 and/or presentation layer 1558. These layers of software architecture executing within the virtual machine 1548 can be the same as corresponding layers previously described or may be different.

Example Machine Architecture and Machine-Readable Medium

Figure 16:
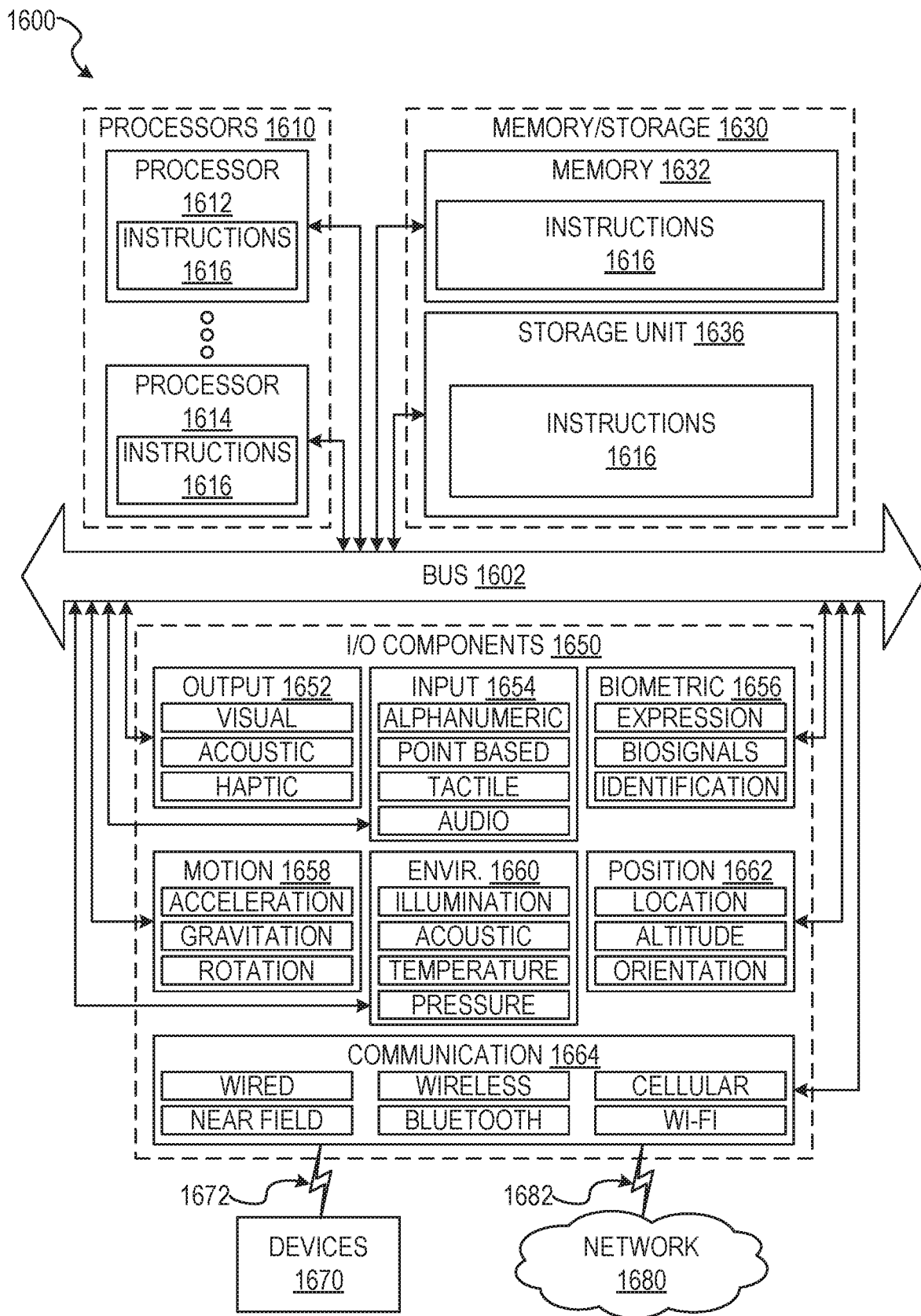
FIG. 16 illustrates a diagrammatic representation of a machine in the form of a computer system within which a set of instructions may be executed for causing the machine to perform any one or more of the methodologies discussed herein, according to an example embodiment.

FIG. 16 is a block diagram illustrating components of a machine 1600, according to some example embodiments, able to read instructions (e.g., processor-executable instructions) from a machine-readable medium (e.g., a machine-readable storage medium) and perform any one or more of the methodologies discussed herein. A machine-readable medium may be understood as or referred to as a non-transitory machine-readable storage device, a non-transitory machine-readable storage medium, a machine-readable storage device, a machine-readable storage medium, a memory, or any other suitable component. Specifically, FIG. 16 shows a diagrammatic representation of the machine 1600 in the example form of a computer system, within which instructions 1616 (e.g., software, a program, an application, an applet, an app, or other executable code) for causing the machine 1600 to perform any one or more of the methodologies discussed herein may be executed. For example, the instructions 1616 may cause the machine 1600 to execute the flow diagrams of FIGS. 3 and 6-9. Additionally, or alternatively, the instructions 1616 may implement the access component 210, the identification component 220, the selection component 230, the element component 240, the search component 250, and the presentation component 260 of FIG. 2, and so forth. The instructions 1616 transform the general, non-programmed machine into a particular machine programmed to carry out the described and illustrated functions in the manner described. In alternative embodiments, the machine 1600 operates as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smartwatch), a smart home device (e.g., a smart appliance), other smart devices, a web appliance, a network router, a network switch, a network bridge, or any machine capable of executing the instructions 1616, sequentially or otherwise, that specify actions to be taken by machine 1600. Further, while only a single machine 1600 is illustrated, the term "machine" shall also be taken to include a collection of machines 1600 that individually or jointly execute the instructions 1616 to perform any one or more of the methodologies discussed herein.

The machine 1600 may include processors 1610, memory/storage 1630, and I/O components 1650, which may be configured to communicate with each other such as via a bus 1602. In an example embodiment, the processors 1610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1612 and processor 1614 that may execute instructions 1616. The term "processor" is intended to include multi-core processor that may comprise two or more independent processors (sometimes referred to as "cores") that may execute instructions 1616 contemporaneously. Although FIG. 16 shows multiple processors 1610, the machine 1600 may include a single processor with a single core, a single processor with multiple cores (e.g., a multi-core process), multiple processors with a single core, multiple processors with multiples cores, or any combination thereof.

The memory/storage 1630 may include a memory 1632, such as a mam memory, or other memory storage, and a storage unit 1636, both accessible to the processors 1610 such as via the bus 1602. The storage unit 1636 and memory 1632 store the instructions 1616 embodying any one or more of the methodologies or functions described herein. The instructions 1616 may also reside, completely or partially, within the memory 1632, within the storage unit 1636, within at least one of the processors 1610 (e.g., within the processor's cache memory), or any suitable combination thereof, during execution thereof by the machine 1600. Accordingly, the memory 1632, the storage unit 1636, and the memory of processors 1610 are examples of machine-readable media.

As used herein, "machine-readable medium" means a device able to store instructions and data temporarily or permanently and may include, but is not be limited to, random-access memory (RAJV[), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1616. The term "machine-readable medium" shall also be taken to include any medium, or combination of multiple media, that is capable of storing instructions (e.g., instructions 1616) for execution by a machine (e.g., machine 1600), such that the instructions, when executed by one or more processors of the machine 1600 (e.g., processors 1610), cause the machine 1600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1650 may include a wide variety of components to receive input, provide output, produce output, transmit information, exchange information, capture measurements, and so on. The specific I/O components 1650 that are included in a particular machine will depend on the type of machine. For example, portable machines such as mobile phones will likely include a touch input device or other such input mechanisms, while a headless server machine will likely not include such a touch input device. It will be appreciated that the I/O components 1650 may include many other components that are not shown in FIG. 16. The I/O components 1650 are grouped according to functionality merely for simplifying the following discussion and the grouping is in no way limiting. In various example embodiments, the I/O components 1650 may include output components 1652 and input components 1654. The output components 1652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1650 may include biometric components 1656, motion components 1658, environmental components 1660, or position components 1662 among a wide array of other components. For example, the biometric components 1656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1658 may include acceleration sensor components (e.g., accelerometer), gravitation sensor components, rotation sensor components (e.g., gyroscope), and so forth. The environmental components 1660 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1662 may include location sensor components (e.g., a Global Position System (G-PS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1650 may include communication components 1664 operable to couple the machine 1600 to a network 1680 or devices 1670 via coupling 1682 and coupling 1672 respectively. For example, the communication components 1664 may include a network interface component or other suitable device to interface with the network 1680. In further examples, communication components 1664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1670 may be another machine or any of a wide variety of peripheral devices (e.g., a peripheral device coupled via a Universal Serial Bus (USB)).

Moreover, the communication components 1664 may detect identifiers or include components operable to detect identifiers. For example, the communication components 1664 may include Radio Frequency Identification (RHD) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1664, such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1680 may be an ad hoc network, an intranet, an extranet, a virtual private network (VPN), a local area network (LAN), a wireless LAN (WLAN), a wide area network (\VAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1680 or a portion of the network 1680 may include a wireless or cellular network and the coupling 1682 may be a Code Division Multiple Access (CDMA) connection, a Global System for Mobile communications (GSM) connection, or other type of cellular or wireless coupling. In this example, the coupling 1682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1616 may be transmitted or received over the network 1680 using a transmission medium via a network interface device (e.g., a network interface component included in the communication components 1664) and utilizing any one of a number of well-known transfer protocols (e.g., hypertext transfer protocol (HTTP)). Similarly, the instructions 1616 may be transmitted or received using a transmission medium via the coupling 1672 (e.g., a peer-to-peer coupling) to devices 1670. The term "transmission medium" shall be taken to include any intangible medium that is capable of storing, encoding, or carrying instructions 1616 for execution by the machine 1600, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   causing, by one or more processors, display of a representation of an item listing with a network-based publication system in a formatted interface;
   causing, by the one or more processors, display of additional representations of additional item listings with the network-based publication system in the formatted interface, wherein the additional item listings are determined to have a threshold similarity to an access request that caused the display of the representation of the item listing and to have at least one differentiating element that does not correspond to the item listing;

determining, by the one or more processors, a set of differentiating elements within the additional item listings; and causing, by the one or more processors, display of selectable interface icons in the formatted interface, the selectable interface icons representing one or more differentiating elements of the set of differentiating elements.

2. The method of claim 1, wherein the set of differentiating elements are elements of the additional item listings that are different from at least one of:

the elements of other additional item listings; or elements of the item listing.

3. The method of claim 1, further comprising:

receiving a selection of a selectable interface icon;

determining the additional item listings that correspond to the one or more differentiating elements represented by the selectable interface icon; and causing a modification of the formatted interface to display representations of at least a subset of determined item listings.

4. The method of claim 3, further comprising:

determining a set of additional differentiating elements within the determined item listings; and causing the modification to display different selectable interface icons in the formatted interface, the different selectable interface icons representing one or more additional differentiating elements of the set of additional differentiating elements.

5. The method of claim 1, further comprising:

clustering the additional item listings based on the set of differentiating elements;

generating a set of representative item listings by selecting a representative item listing from the additional item listings in each cluster; and determining the additional representations of the additional item listings to display in the formatted interface from the set of representative item listings.

6. The method of claim 5, wherein the additional item listings in each cluster share at least one differentiating element of the set of differentiating elements.

7. The method of claim 5, wherein at least one differentiating element of the set of differentiating elements corresponds to price such that the additional item listings are clustered into different clusters based on respective prices.

8. The method of claim 1, wherein the item listing and the additional item listings list items available for purchase via the network-based publication system.

9. A system comprising:

one or more processors; and a memory storing instructions stored that are executable by the one or more processors to perform operations including:

causing display of a representation of an item listing with a network-based publication system in a formatted interface;

causing display of additional representations of additional item listings with the network-based publication system in the formatted interface, wherein the additional item listings are determined to have a threshold similarity to an access request that caused the display of the representation of the item listing and to have at least one differentiating element that differentiates the item listing from the additional item listings;

determining a set of differentiating elements within the additional item listings; and causing display of selectable interface icons in the formatted interface, the selectable interface icons representing one or more differentiating elements of the set of differentiating elements.

10. The system of claim 9, wherein the set of differentiating elements are elements of the additional item listings that are different from at least one of:

the elements of other additional item listings; or elements of the item listing.

11. The system of claim 9, wherein the operations further include:

receiving a selection of a selectable interface icon;

determining the additional item listings that correspond to the one or more differentiating elements represented by the selectable interface icon; and causing a modification of the formatted interface to display representations of at least a subset of determined item listings.

12. The system of claim 11, wherein the operations further include:

determining a set of additional differentiating elements within the determined item listings; and causing the modification to display different selectable interface icons in the formatted interface, the different selectable interface icons representing one or more additional differentiating elements of the set of additional differentiating elements.

13. The system of claim 9, wherein the operations further include:

clustering the additional item listings based on the set of differentiating elements;

generating a set of representative item listings by selecting a representative item listing from the additional item listings in each cluster; and determining the additional representations of the additional item listings to display in the formatted interface from the set of representative item listings.

14. The system of claim 13, wherein the additional item listings in each cluster share at least one differentiating element of the set of differentiating elements.

15. The system of claim 13, wherein at least one differentiating element of the set of differentiating elements corresponds to price such that the additional item listings are clustered into different clusters based, in part, on respective prices.

16. The system of claim 9, wherein the item listing and the additional item listings list items available for purchase via the network-based publication system.

17. One or more computer storage media storing instructions that are executable by at least one processor to perform operations comprising:

causing display of a representation of an item listing with a network-based publication system in a formatted interface;

causing display of additional representations of additional item listings with the network-based publication system in the formatted interface, wherein the additional item listings are determined to have a threshold similarity to an access request that caused the display of the representation of the item listing and to have at least one differentiating element that differentiates the item listing from the additional item listings;

determining a set of differentiating elements within the additional item listings; and causing display of selectable interface icons in the formatted interface, the selectable interface icons representing one or more differentiating elements of the set of differentiating elements.

18. The one or more computer storage media of claim 17, wherein the set of differentiating elements are elements of the additional item listings that are different from at least one of:
   the elements of other additional item listings; or
   elements of the item listing.

19. The one or more computer storage media of claim 17, wherein the operations further comprise:
   receiving a selection of a selectable interface icon;
   determining the additional item listings that correspond to the one or more differentiating elements represented by the selectable interface icon; and
   causing a modification of the formatted interface to display representations of at least a subset of determined item listings.

20. The one or more computer storage media of claim 19, wherein the operations further comprise:
   determining a set of additional differentiating elements within the determined item listings; and
   causing the modification to display different selectable interface icons in the formatted interface, the different selectable interface icons representing one or more additional differentiating elements of the set of additional differentiating elements.

* * * * *